United States Patent
Ebara et al.

(10) Patent No.: US 11,321,208 B2
(45) Date of Patent: May 3, 2022

(54) DISTRIBUTED STORAGE SYSTEM AND DISTRIBUTED STORAGE CONTROL METHOD

(71) Applicant: Hitachi, Ltd., Tokyo (JP)

(72) Inventors: Hiroto Ebara, Tokyo (JP); Mitsuo Hayasaka, Tokyo (JP); Takeru Chiba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 293 days.

(21) Appl. No.: 16/492,051

(22) PCT Filed: Sep. 6, 2017

(86) PCT No.: PCT/JP2017/032024
§ 371 (c)(1),
(2) Date: Sep. 6, 2019

(87) PCT Pub. No.: WO2019/049224
PCT Pub. Date: Mar. 14, 2019

(65) Prior Publication Data
US 2020/0034263 A1    Jan. 30, 2020

(51) Int. Cl.
*G06F 11/00* (2006.01)
*G06F 11/30* (2006.01)
(Continued)

(52) U.S. Cl.
CPC .......... *G06F 11/3034* (2013.01); *G06F 3/067* (2013.01); *G06F 3/0619* (2013.01);
(Continued)

(58) Field of Classification Search
CPC ............ G06F 11/2015; G06F 11/1076; G06F 11/2094; G06F 11/3034; G06F 11/3006
See application file for complete search history.

(56) References Cited

U.S. PATENT DOCUMENTS 4,506,323 A * 3/1985 Pusic ........................ G06F 1/28
711/161
5,623,595 A * 4/1997 Bailey ................. G06F 11/1076
348/E7.073
(Continued)

FOREIGN PATENT DOCUMENTS

JP    H10-312246 A    11/1998
JP    2009-527062 A    7/2009
(Continued)

*Primary Examiner* — Amine Riad
(74) *Attorney, Agent, or Firm* — Procopio, Cory, Hargreaves & Savitch LLP

(57) ABSTRACT

A distributed storage system, which receives a write request from a client, includes a plurality of computers which receive power supply from a plurality of power supply units. A first computer, among the plurality of computers, which is a computer that receives the write request from the client, is configured to: cache updated data which is at least apart of data accompanying the write request; select n second computers which are n computers (n is a natural number) among computers each receiving power from a power supply unit different from a power supply unit of the first computer as transfer destinations of the updated data; and transfer the updated data to the selected n second computers, respectively. At least one of the n second computers, when caching the updated data from the first computer, is configured to return a result to the first computer.

12 Claims, 21 Drawing Sheets

(51) Int. Cl.
*G06F 3/06* (2006.01)
*G06F 9/48* (2006.01)
*G06F 11/10* (2006.01)
*G06F 11/20* (2006.01)
*G06F 12/0813* (2016.01)

(52) U.S. Cl.
CPC .......... *G06F 3/0653* (2013.01); *G06F 9/4856* (2013.01); *G06F 9/4893* (2013.01); *G06F 11/10* (2013.01); *G06F 11/2015* (2013.01); *G06F 11/3006* (2013.01); *G06F 12/0813* (2013.01)

(56) References Cited

U.S. PATENT DOCUMENTS

| | | | | |
|---|---|---|---|---|
| 5,640,530 | A * | 6/1997 | Beardsley | G06F 11/1666 711/113 |
| 5,784,548 | A * | 7/1998 | Liong | G06F 1/30 714/6.24 |
| 5,991,852 | A * | 11/1999 | Bagley | G06F 11/2043 361/679.32 |
| 6,065,102 | A * | 5/2000 | Peters | G06F 12/0866 710/107 |
| 8,862,808 | B2 * | 10/2014 | Tsukamoto | G06F 11/1441 711/103 |
| 9,336,132 | B1 | 5/2016 | Aron et al. | |
| 10,481,660 | B1 * | 11/2019 | Feldman | G06F 1/266 |
| 2003/0066010 | A1 * | 4/2003 | Acton | G11B 20/18 714/758 |
| 2004/0193955 | A1 * | 9/2004 | Leete | G06F 11/2015 714/22 |
| 2005/0080762 | A1 * | 4/2005 | Nakashima | G06F 11/1435 |
| 2005/0120251 | A1 * | 6/2005 | Fukumori | G06F 1/30 713/300 |
| 2007/0195692 | A1 | 8/2007 | Hagglund et al. | |
| 2010/0318844 | A1 * | 12/2010 | Matsuda | G06F 11/2089 714/6.12 |
| 2014/0365817 | A1 * | 12/2014 | Tanaka | G06F 11/2094 714/6.21 |
| 2015/0106650 | A1 * | 4/2015 | Chujo | G06F 11/0751 714/6.23 |
| 2015/0200685 | A1 * | 7/2015 | Kawano | G06F 11/108 714/758 |
| 2016/0371161 | A1 * | 12/2016 | Louie | G06F 3/0647 |
| 2017/0220249 | A1 * | 8/2017 | Jibbe | G06F 11/0727 |
| 2019/0354157 | A1 * | 11/2019 | Cui | G06F 1/3287 |
| 2020/0250037 | A1 * | 8/2020 | Koren | G06F 3/0689 |

FOREIGN PATENT DOCUMENTS

| | | |
|---|---|---|
| WO | 2016/194095 A1 | 12/2016 |
| WO | 2017/119091 A1 | 7/2017 |

* cited by examiner

[FIG. 1]
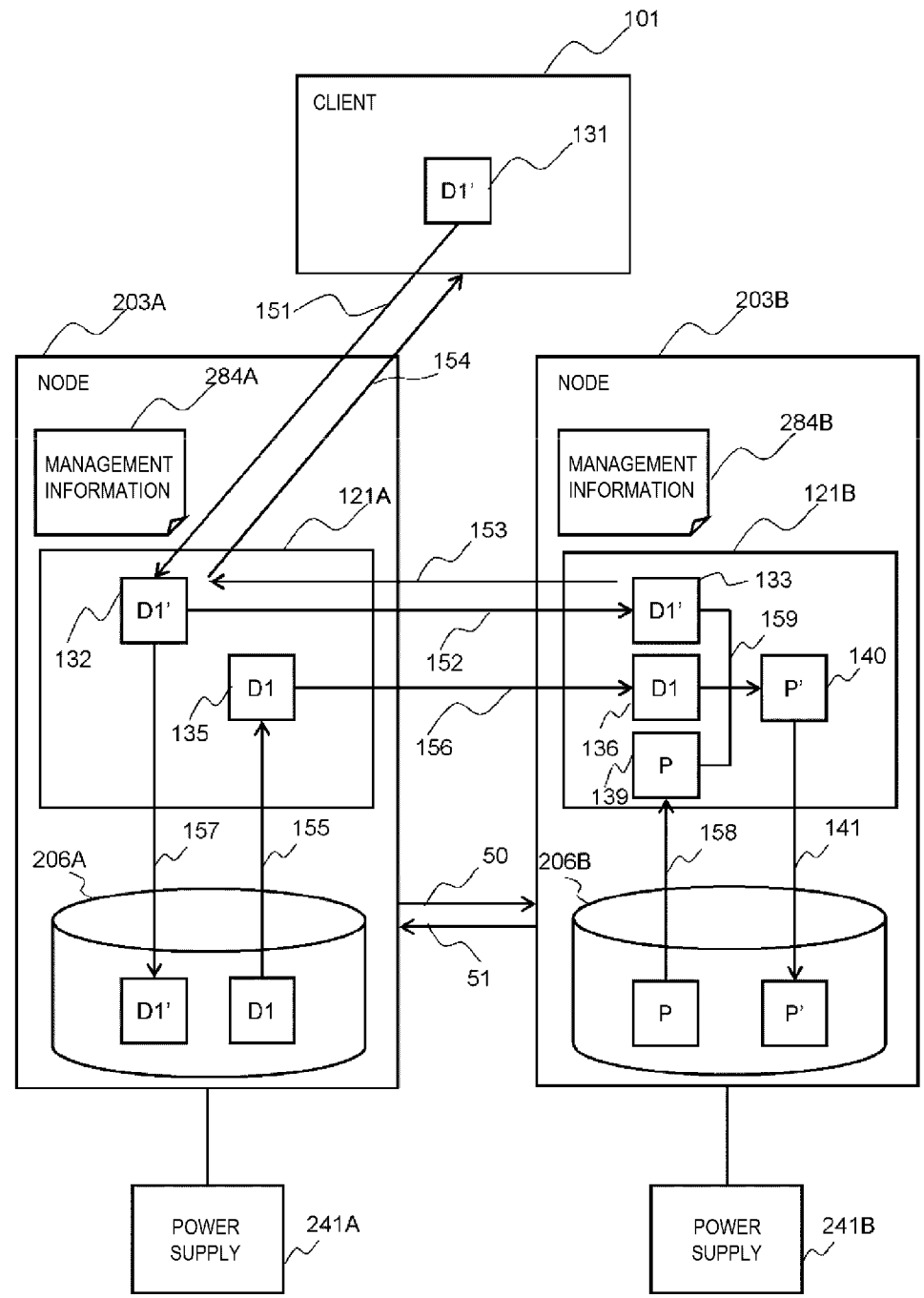

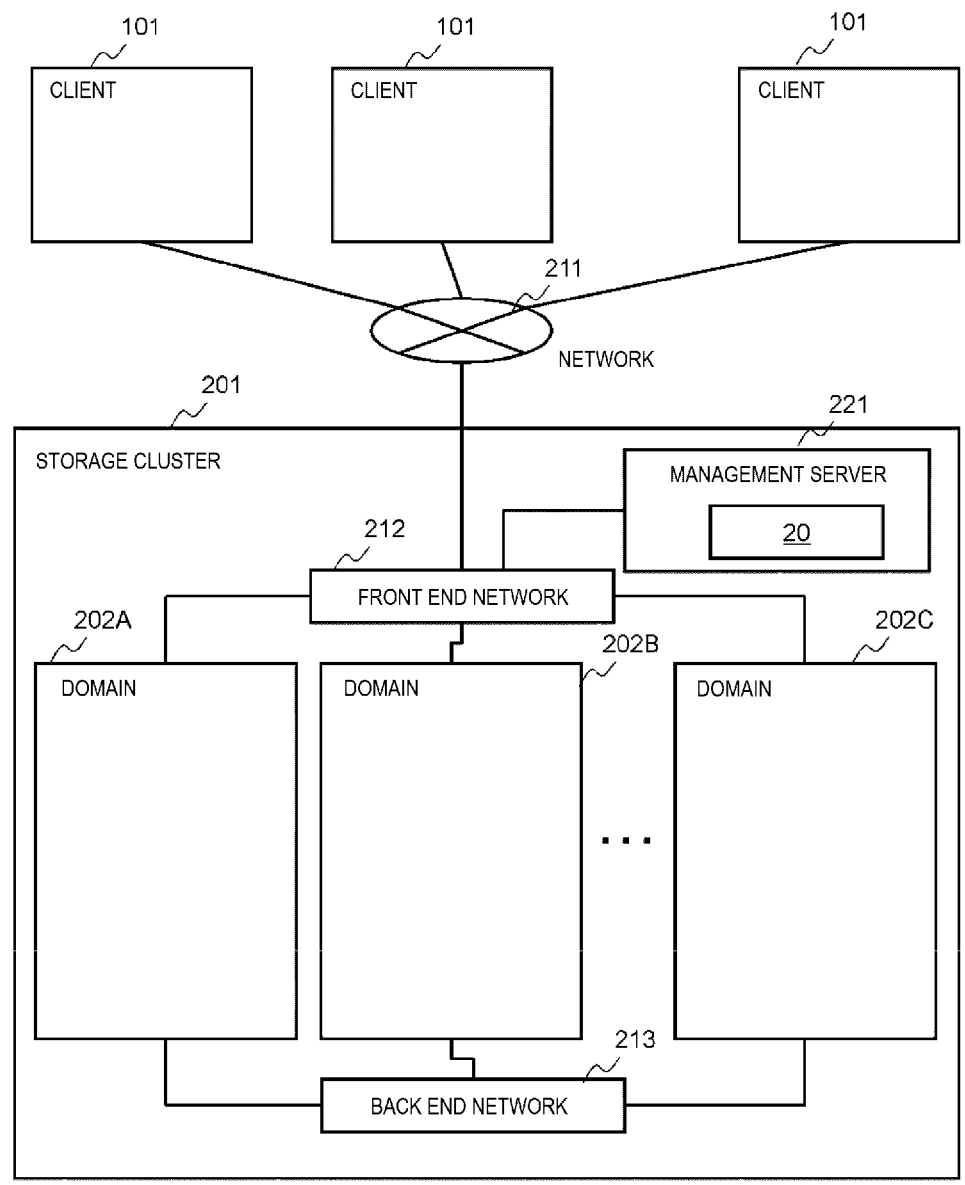

[FIG. 3]
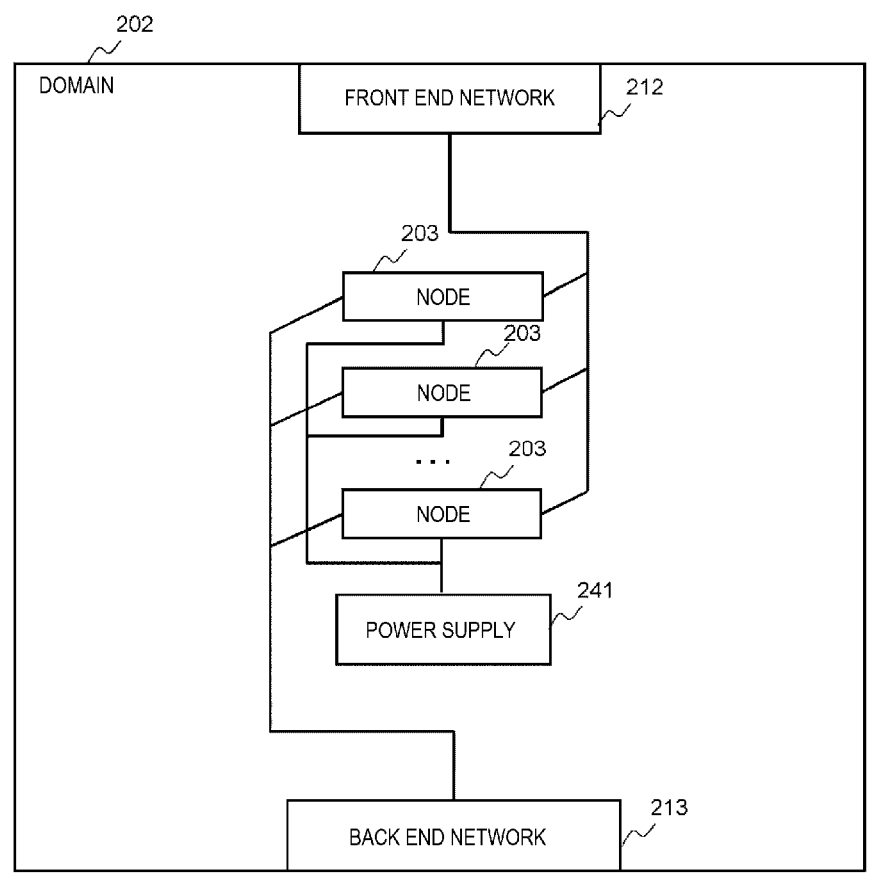

[FIG. 4]
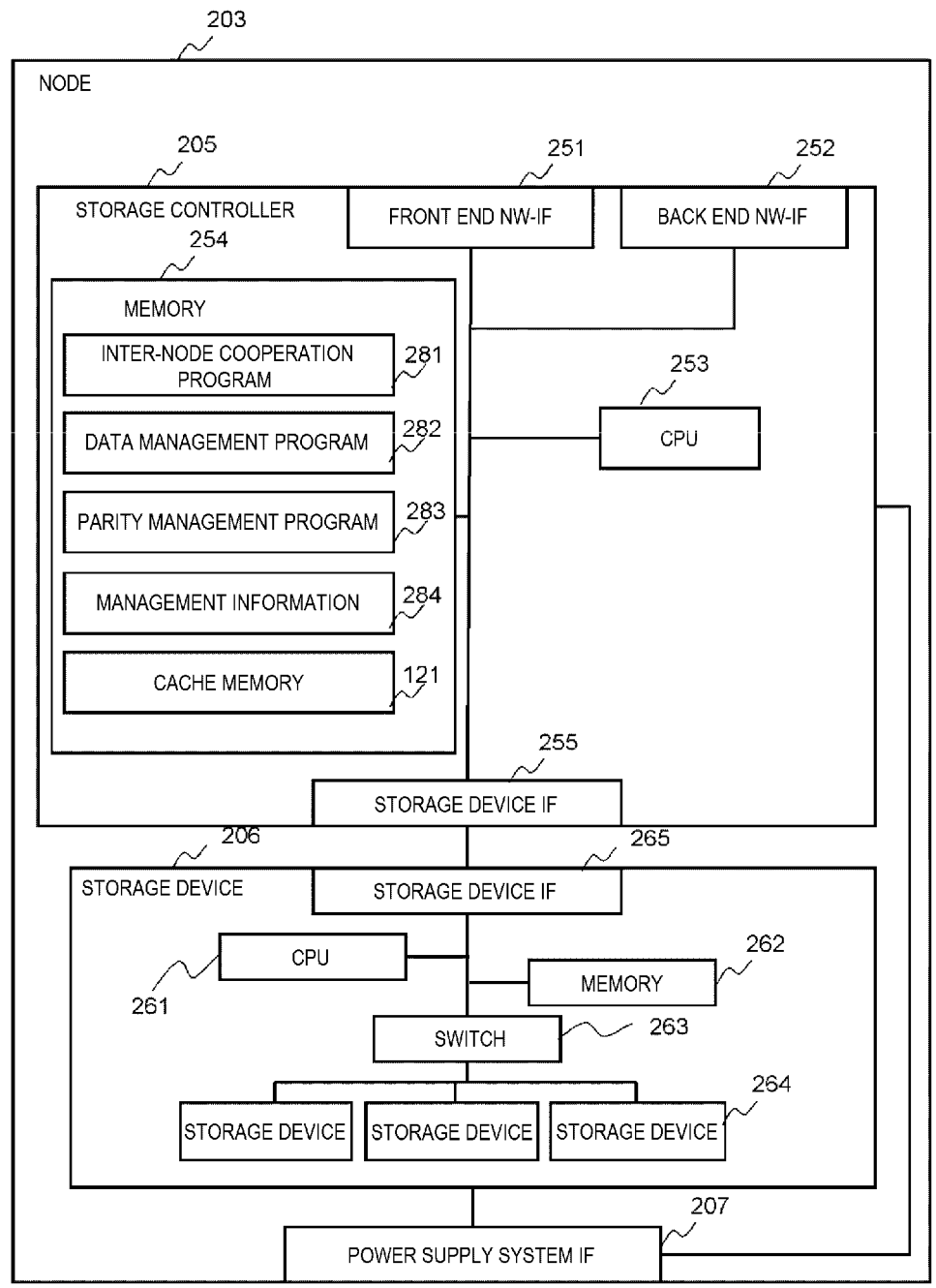

[FIG. 5]
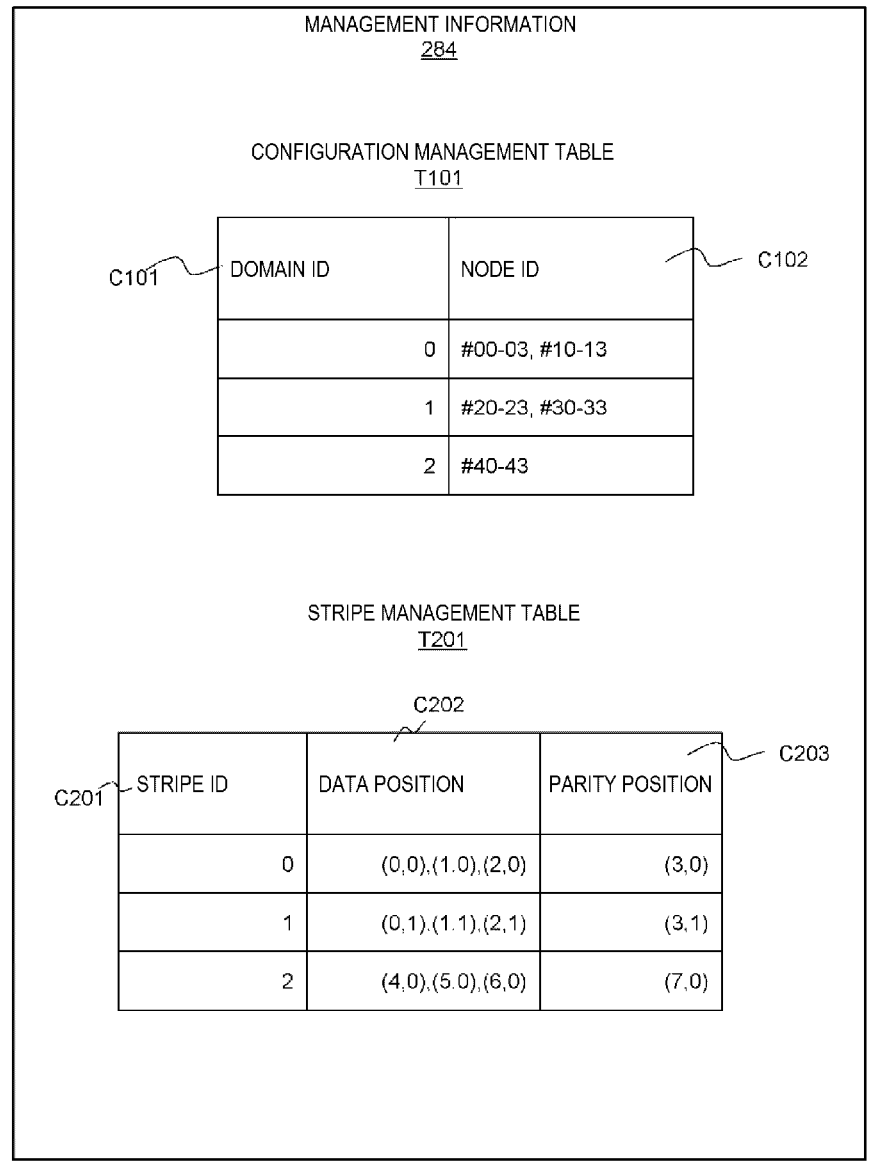

[FIG. 6]
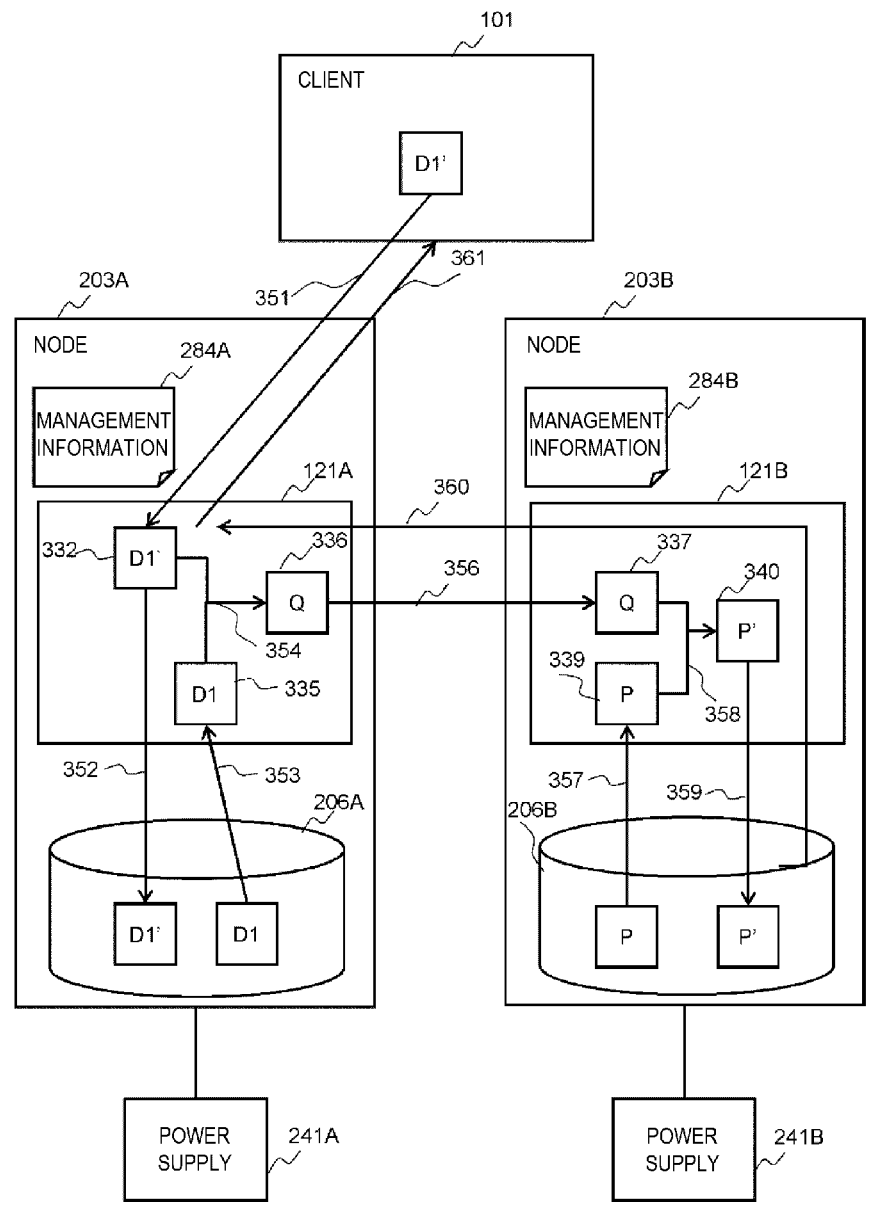

[FIG. 7]
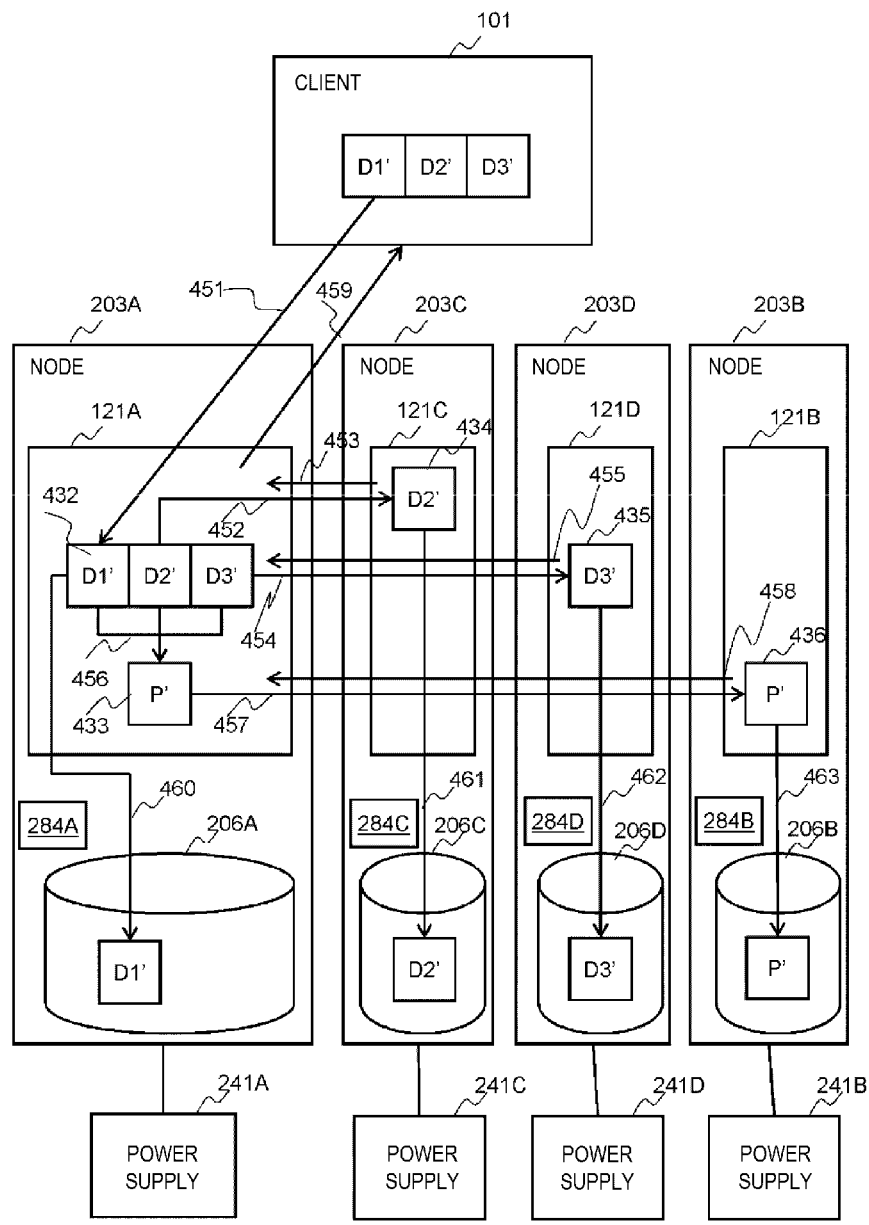

[FIG. 8]
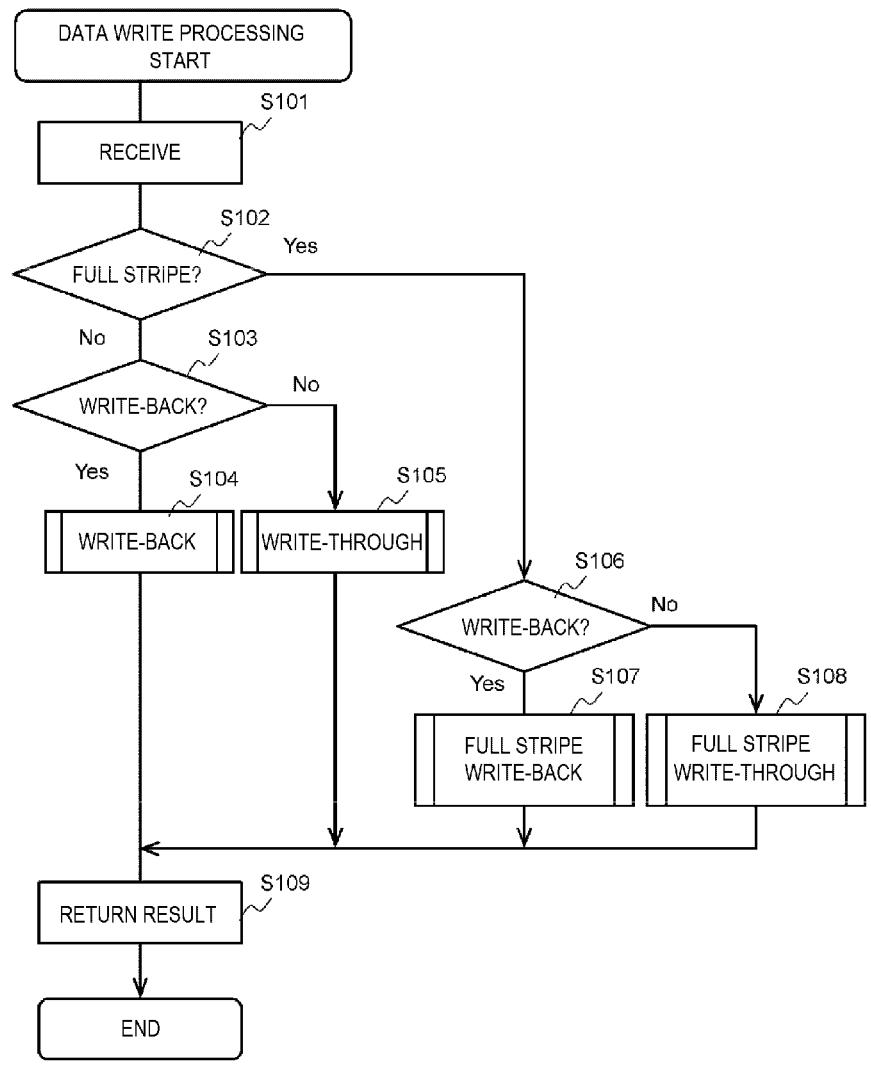

[FIG. 9]
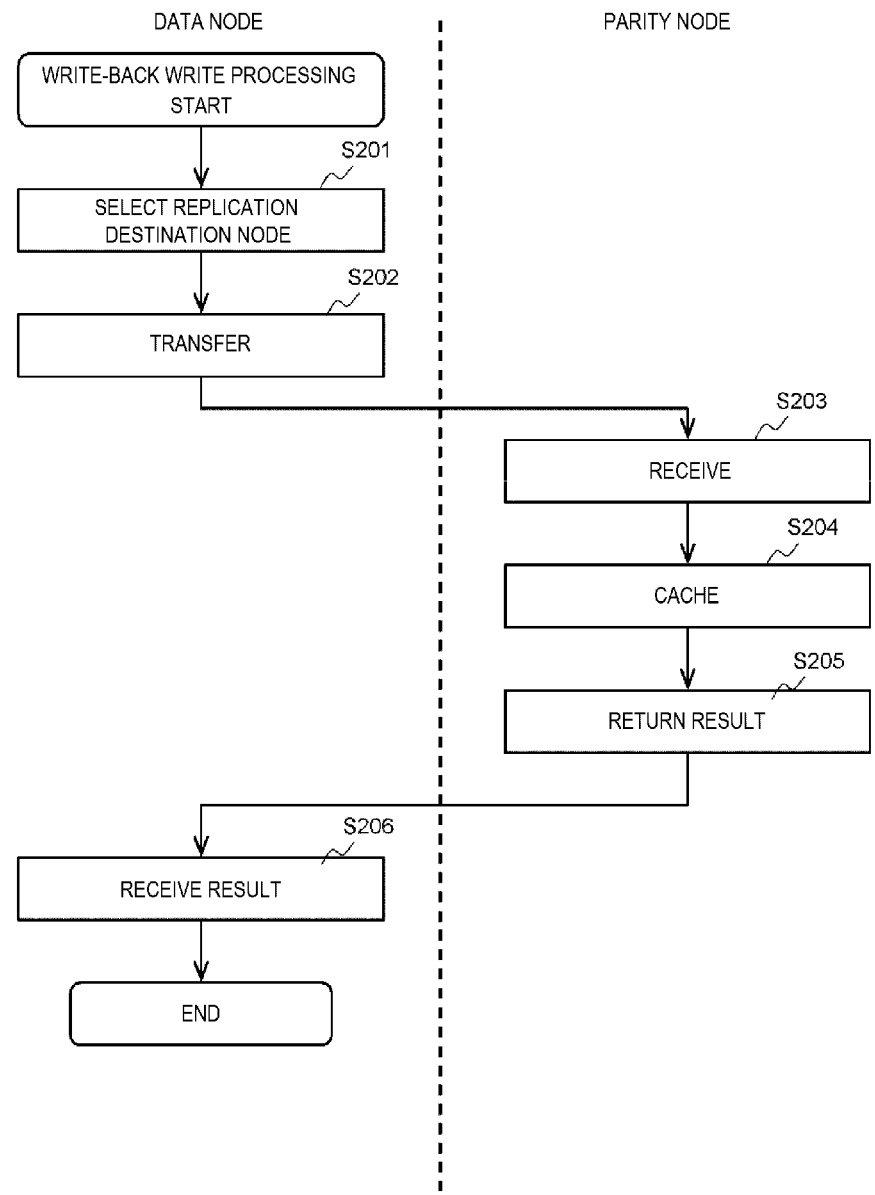

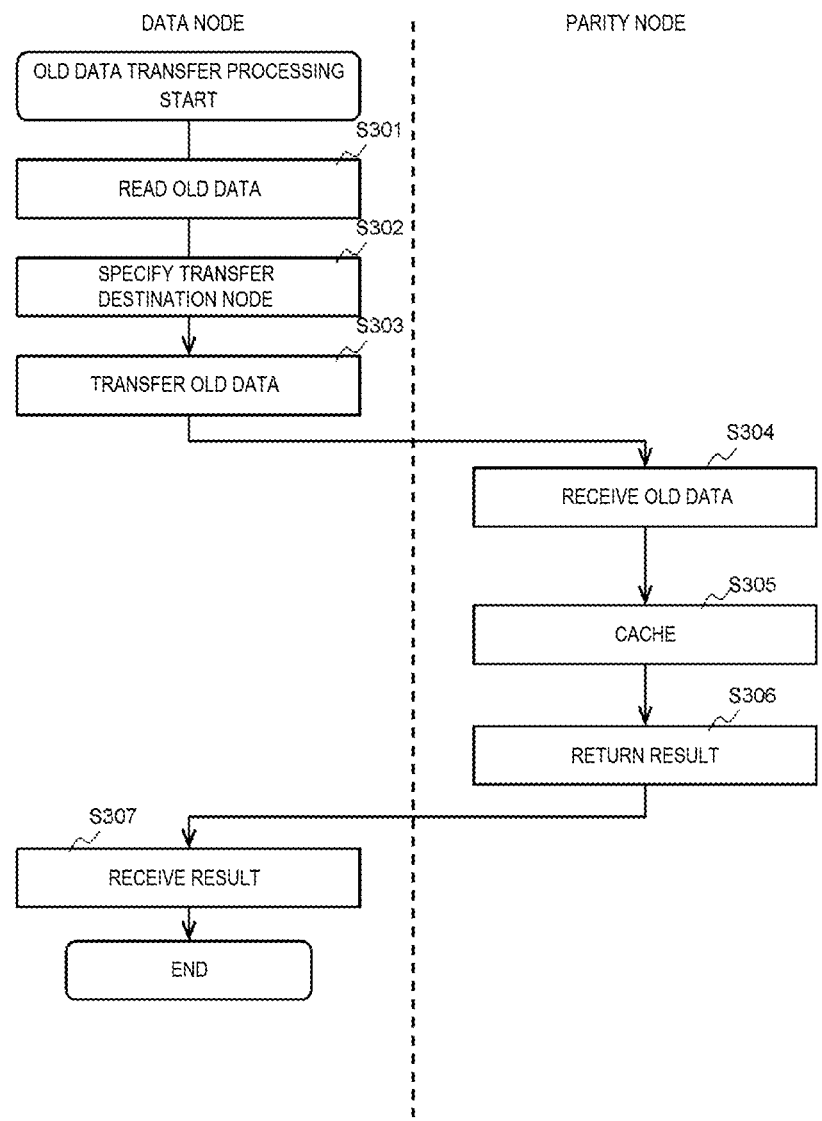

[FIG. 11]
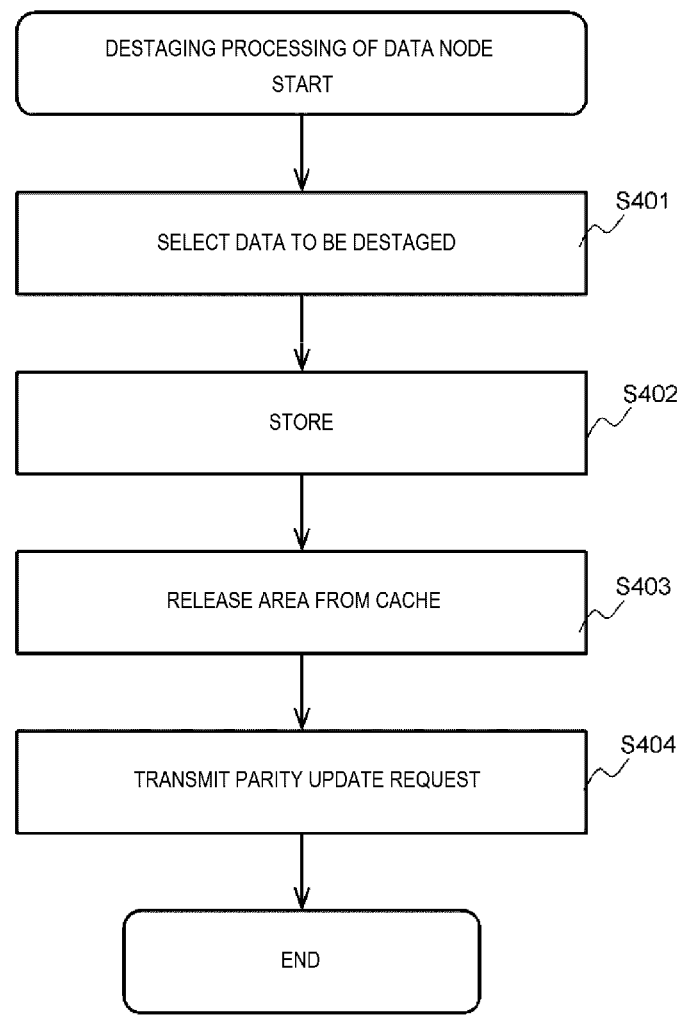

[FIG. 12]
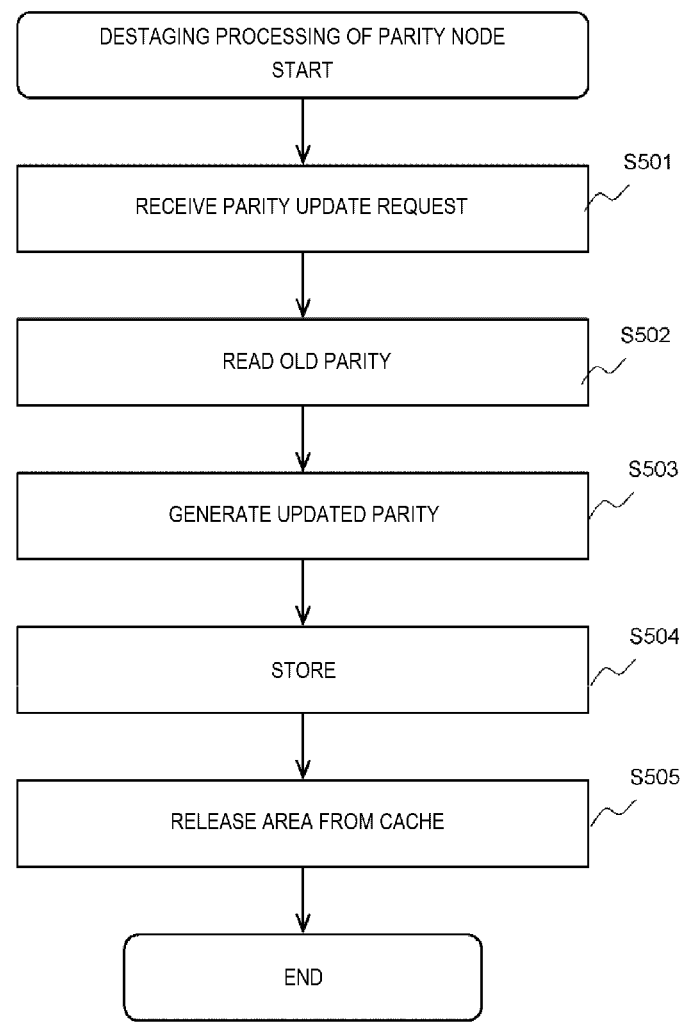

[FIG. 13]
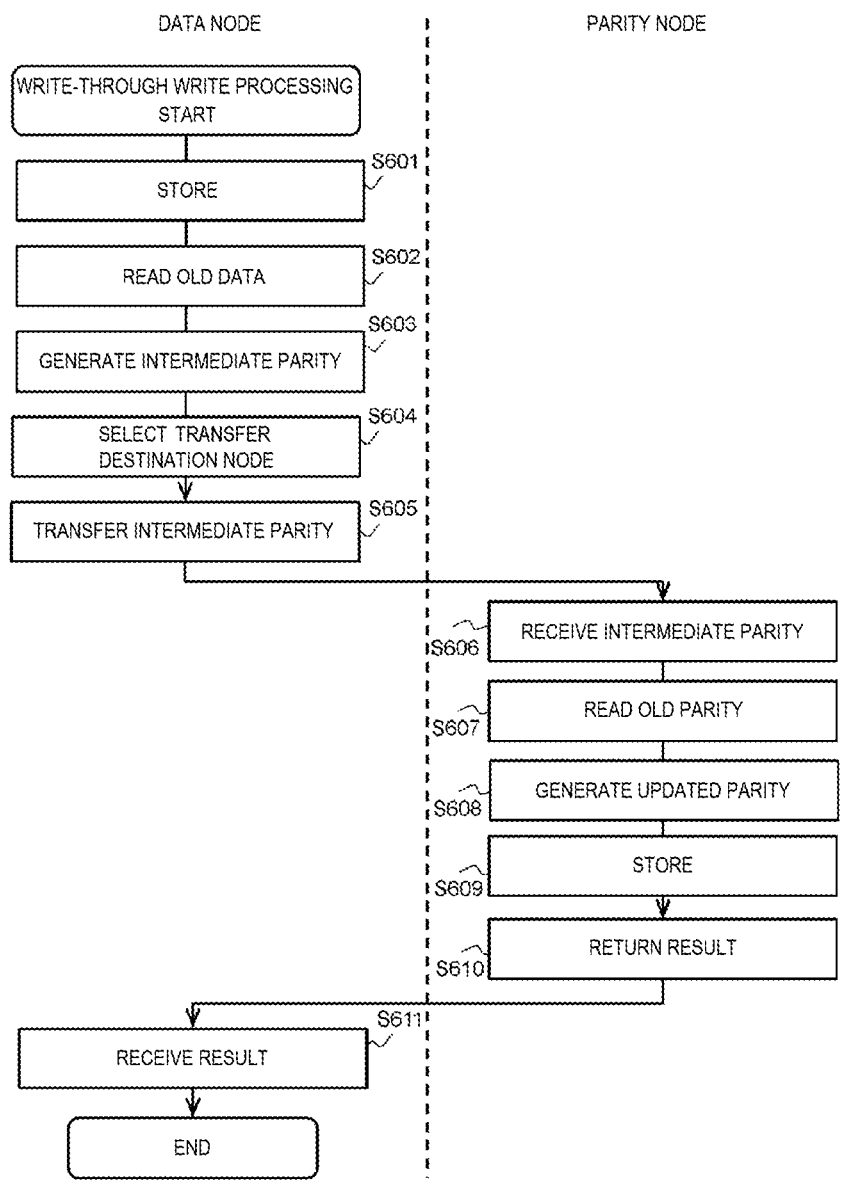

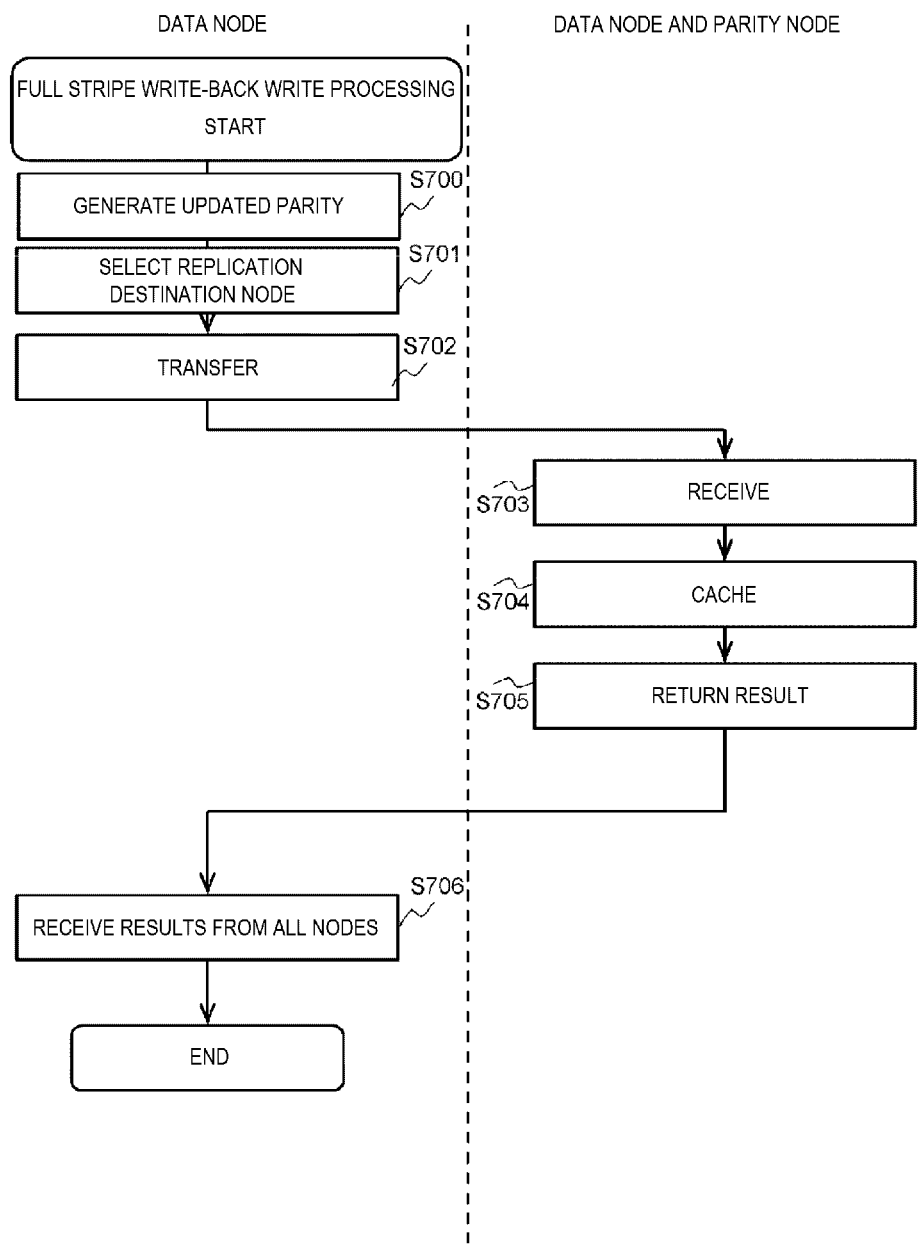

[FIG. 15]
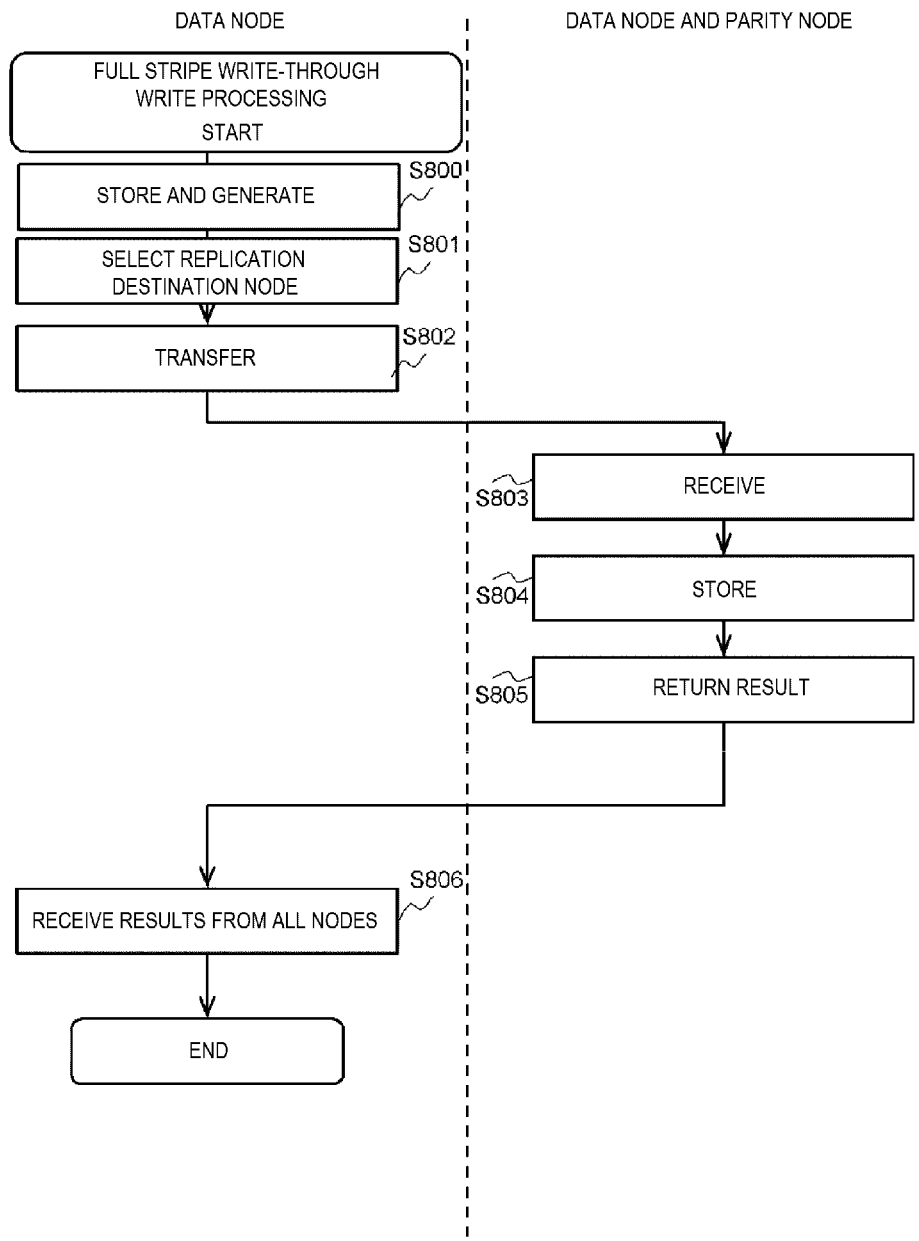

[FIG. 16]
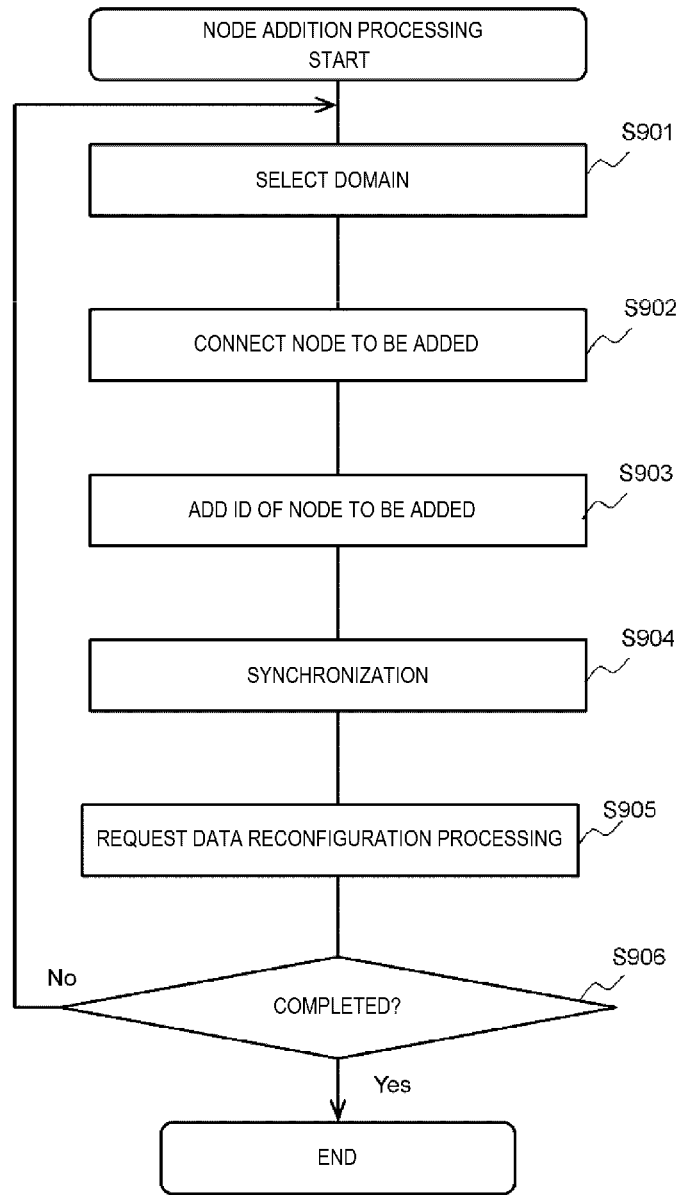

[FIG. 17]
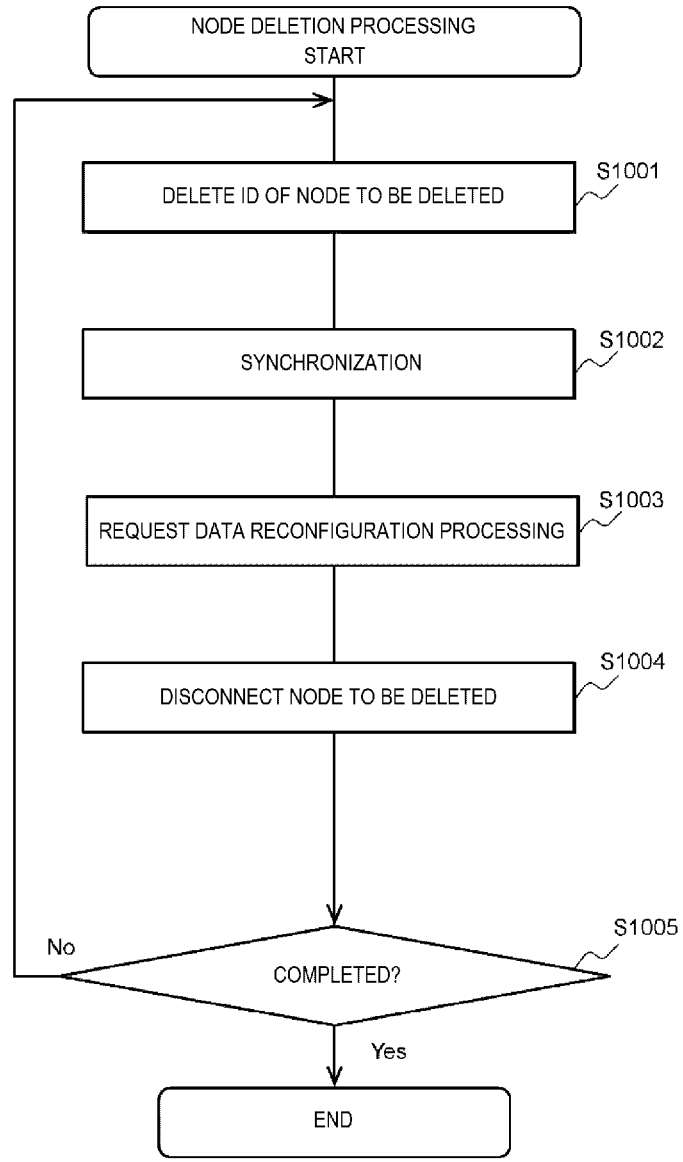

[FIG. 18]
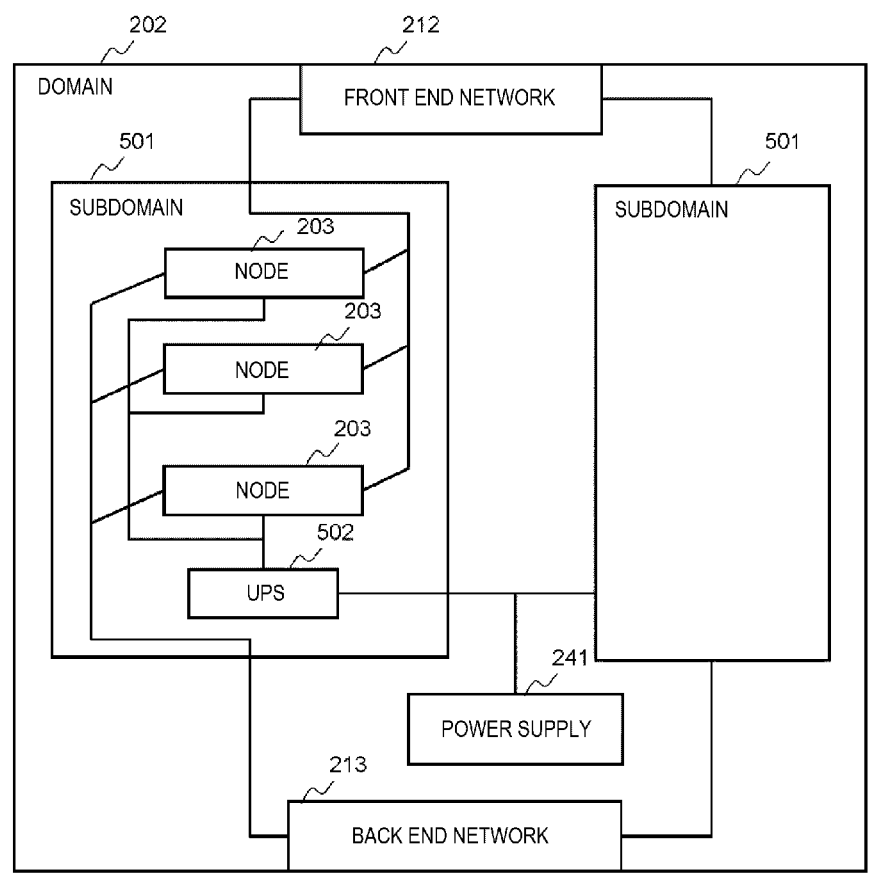

[FIG. 19]

CONFIGURATION MANAGEMENT TABLE
T101

| DOMAIN ID (C101) | SUBDOMAIN ID (C301) | NODE ID (C102) |
|---|---|---|
| 0 | 0 | #00-03 |
| 0 | 1 | #10-13 |
| 1 | 0 | #20-23 |
| 1 | 1 | #30-33 |
| 2 | 0 | #40-43 |

[FIG. 20]
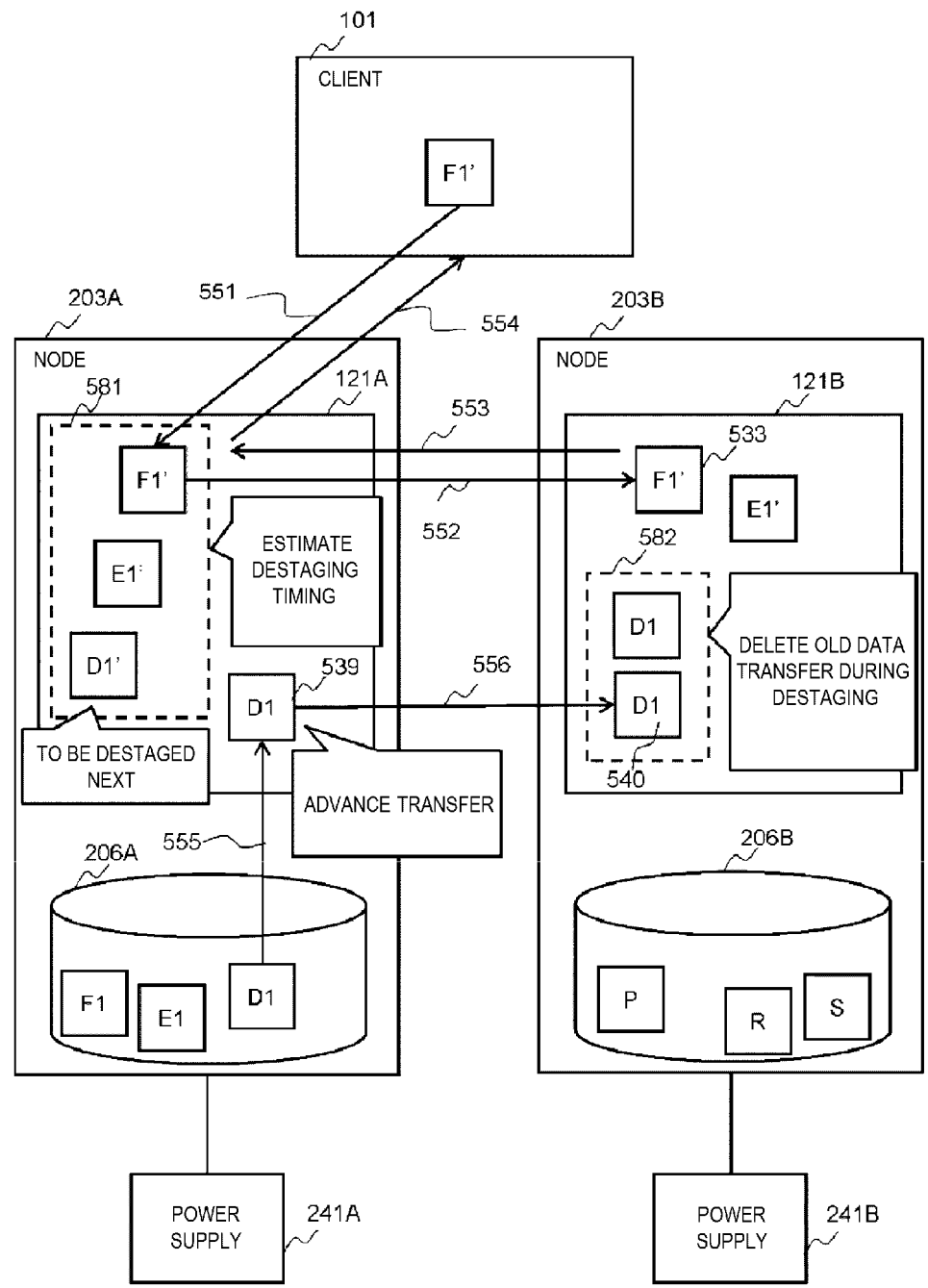

[FIG. 21]
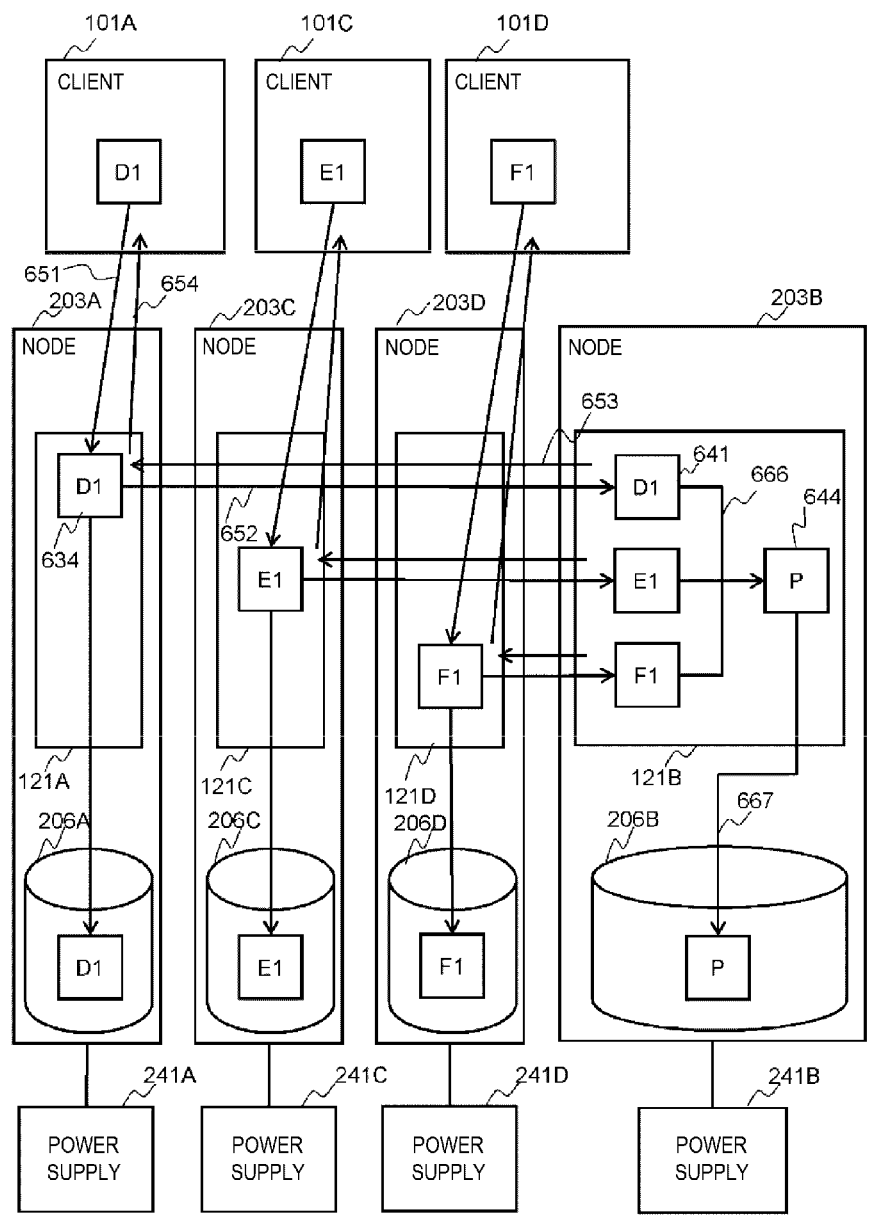

DISTRIBUTED STORAGE SYSTEM AND DISTRIBUTED STORAGE CONTROL METHOD

TECHNICAL FIELD

The present invention generally relates to storage control in a distributed storage system.

BACKGROUND ART

A software defined storage (SDS) is known which configures a distributed storage system by cooperating with a plurality of computers (nodes) using software which provides a storage function.

As a technique related to the SDS, PTL 1 discloses a technique of realizing redundancy of data between nodes in data write processing by holding replication of data between a plurality of nodes on a solid state drive (SSD) which is a nonvolatile storage device.

PRIOR ART LITERATURE

Patent Literature

PTL 1: U.S. Pat. No. 9,336,132

SUMMARY OF INVENTION

Technical Problem

The distributed storage system protects data by making data redundant. At this time, data transfer is performed between nodes and data is made permanent for each node (that is, the data is written to the nonvolatile storage device), and then a client is responded. Therefore, the write response performance to the client may be deteriorated.

For example, in a storage system as in PTL 1, in order to make data redundant, the updated data and the replication of the updated data are duplicated to a plurality of nodes having the SSD as a cache. For this reason, the write response performance equivalent to write-through write (write data to the nonvolatile storage device such as the SSD, then respond to write completion) may be deteriorated.

The write response performance may also be deteriorated in distributed storage systems other than the distributed storage system using SDS.

Solution to Problem

A distributed storage system, which receives a write request from a client, includes a plurality of computers which receive power from a plurality of power supply units. A first computer, among the plurality of computers, which is a computer that receives the write request from the client, is configured to: cache updated data which is at least a part of data accompanying the write request; select n second computers which are n computers (n is a natural number) among computers each receiving power from a power supply unit different from a power supply unit of the first computer as transfer destinations of the updated data; and transfer the updated data to the selected n second computers, respectively. At least one of the n second computers, when caching the updated data from the first computer, is configured to return a result to the first computer. That is, the first computer may not wait for the updated data to be cached in all of the n second computers.

Advantageous Effect

Both prevention of data loss and reduction of the write response time to the client can be realized even if power is interrupted due to a failure or the like of the power supply unit.

BRIEF DESCRIPTION OF DRAWINGS

FIG. 1 shows an outline of data write processing according to a first embodiment.
FIG. 2 shows a configuration of a distributed storage system.
FIG. 3 shows a configuration of a domain.
FIG. 4 shows a configuration of a node.
FIG. 5 shows a table in management information.
FIG. 6 shows an outline of write-through write processing.
FIG. 7 shows an outline of full stripe write processing.
FIG. 8 shows a processing flow of the data write processing.
FIG. 9 shows a processing flow of write-back write.
FIG. 10 shows a processing flow of old data transfer processing.
FIG. 11 shows a processing flow of destaging processing of a data node.
FIG. 12 shows a processing flow of destaging processing of a parity node.
FIG. 13 shows a processing flow of the write-through write processing.
FIG. 14 shows a processing flow of full stripe write-back write processing.
FIG. 15 shows a processing flow of full strip write-through write processing.
FIG. 16 shows a processing flow of node addition processing.
FIG. 17 shows a processing flow of node deletion processing.
FIG. 18 shows a configuration of a domain according to a second embodiment.
FIG. 19 shows a power supply system configuration management table according to the second embodiment.
FIG. 20 shows an outline of old data transfer processing according to a third embodiment.
FIG. 21 shows an outline of data write processing according to a fourth embodiment.

DESCRIPTION OF EMBODIMENTS

Hereinafter, some embodiments will be described with reference to the drawings.

In the following description, although various kinds of information may be described in an expression "aaa table", various kinds of information may be expressed by a data structure other than the table. The "aaa table" may also be called "aaa information" to show that the information does not depend on the data structure.

In the following description, an "interface unit" may include one or more communication interface devices. The one or more communication interface devices may be one or more communication interface devices of the same kinds (for example, one or more network interface cards (NIC)), and may be two or more communication interface devices of different kinds (for example, NIC and host bus adapter (HBA)). In the following description, the configuration of each table is an example, and one table may be divided into two or more tables, or all or a part of the two or more tables may be combined in one table.

In the following description, a "PDEV" is a physical non-volatile storage device (for example, an auxiliary storage device), for example, a non-volatile memory, a hard disk drive (HDD), or a solid state drive (SSD).

In the following description, a "storage unit" includes at least a memory unit among memory units and PDEV units. A "PDEV unit" includes one or more PDEVs. The "memory unit" includes one or more memories. At least one memory may be a volatile memory or a non-volatile memory. The storage unit is mainly used in processing by a processor unit.

In the following description, the "processor unit" includes one or more processors. At least one processor may be a central processing unit (CPU). The processor unit may include a hardware circuit which performs a part or all of the processing.

In the following description, although the processing is described using a "program." as a subject, the program is executed by a processor unit (for example, a central processing unit (CPU)) to perform determined processing appropriately using a storage unit (for example, a memory) and/or an interface unit (for example, a port), so that the subject of the processing may be the program. The processing described using the program as the subject may be the processing performed by a processor unit or a computer (for example, nodes) which includes the processor unit. A controller (storage controller) may be the processor unit, or may include the hardware circuit which performs a part or all of the processing performed by the controller. The programs may be installed on each controller from a program source. The program source may be, for example, a program distribution server or a computer-readable (for example, non-transitory) storage medium. In the following description, two or more programs may be realized as one program, or one program may be realized as two or more programs.

In the following description, an ID is used as identification information of an element, but instead of ID or in addition to ID, other kinds of identification information may be used.

In the following description, when the same kind of element is described without distinction, a common number in the reference sign numeral is used, and when the same kind of element is separately described, the reference sign numeral of the element may be used.

In the following description, a distributed storage system includes one or more physical computers (nodes). The one or more physical computers may include at least one among physical servers and physical storage. At least one physical computer may execute a virtual computer (for example, a virtual machine (VM)) or execute software-defined anything (SDx). For example, a software defined storage (SDS) (an example of a virtual storage device) or a software-defined datacenter (SDDC) can be adopted as the SDx.

In the following description, a redundant configuration group can be formed by a plurality of nodes. An example of the redundant configuration may include any one of erasure coding, redundant array of independent nodes (RAIN), mirroring between nodes, and redundant array of independent (or inexpensive) disks (RAID) in which a node is regarded as one drive. Other method (method of configuring the redundant configuration group between nodes) may be adopted. Accordingly, in the following description, the "redundant configuration group" may be a group configured with two or more storage areas respectively provided by two or more nodes to store data.

In the following description, definition of each of a plurality of kinds of storage areas is as follows.

A "redundant configuration area" is a logical storage area provided by the redundant configuration group.

A "node area" is a logical storage area provided by each of a plurality of nodes. The redundant configuration area is configured with a plurality of node areas respectively provided by a plurality of nodes.

A "strip" is a part of the node area. The strip stores a user data set or parity. A strip in which the user data set is stored may be referred to as a "user strip", and a strip in which the parity is stored may be referred to as a "parity strip". The "user data set" is a part of a user data unit as at least a part of user data (data to be written) accompanying a write request. The "user data unit" is a set of all user data sets corresponding to the stripe. A "data set" is data stored in one strip, and is the user data set or the parity in the following description. That is, the data set is data in a strip unit.

The "stripe" is a storage area configured with two or more strips (for example, two or more strips of the same logical address) respectively exist in two or more node areas in the redundant configuration area. One or more parities may be prepared for each stripe.

In the following description, the "user data" and the "parity" are used in the sense of the data set, but may be data (for example, a file) with a size larger than that of the data set.

In the following description, a "cache memory" is typically a volatile memory, and may be a partial area provided on a memory (typically volatile memory) in which the program or management information is stored, but may be a memory provided separately from the volatile memory.

First Embodiment

FIG. 1 is a block diagram showing an outline of data write processing according to a first embodiment. According to the present embodiment, a "replication source" is an example of a "transfer source" and a "replication destination" is an example of a "transfer destination". The replication destination may be anode which is a storage destination of a parity corresponding to updated data.

A client (101) is a device (computer) for a user to use a storage function. The client (101) may be, for example, a desktop computer, a server, or a portable terminal such as a smartphone. The client (101) is connected to all nodes which configure a storage cluster via a network.

A node (203) has a data management function and a parity management function. The data management function is a function of storing data of a client. The data management function refers to performing, for example, processing of making data permanent by writing data to a storage device of a node, and processing of making data redundant by transferring and replicating data to another node. The parity management function is a function which realizes data protection such as RAID and erasure coding. The parity management function refers to generating, for example, a parity based on data from the client (101), and storing the generated parity. The parity management function realizes data protection by, for example, generating a parity based on data of the node or data received from another node and writing the generated parity to the storage device of the node. In the present embodiment, when a certain node executes the data management function, a node which executes the parity management function corresponding to that node exists. Each of the nodes (203) may have both the data management function and the parity management function. The node (203) belongs to a storage cluster and a set of a plurality of nodes called a domain. Details of the storage cluster and the domain will be described later.

The node (203) has a power supply (241). The power supply (241) supplies power to at least a cache memory (121) among the elements in the node (203). Therefore, when power is interrupted due to a failure of the power supply (241), data in the cache memory (121) is lost.

A power supply arrangement configuration such as which power supply (241) existing in which domain is managed by management information (284) of the node (203). In the present embodiment, a node (203A) which receives a data write request from the client (101) selects, based on management information (284A) of the node (203A), a node (203B) having a (another) power supply (241B) different from a power supply (241A) of the node (203A) which receives the data as a replication destination node of the data. When receiving the transferred data and writing the data to a cache memory (121B), the selected replication destination node (203B) returns a completion response to the replication source (transfer source) node (203A). When receiving the completion response, anode (101A) returns the completion response for the write request to the client 101. Accordingly, the write response performance can be improved. Even if power is interrupted in one of the node (203A) and the node (203B) before the permanence of updated data (D1'), it is possible to prevent the loss of the updated data (D1'). The reason is that the power supplies (241) of the node (203A) and the node (203B) are different, even if power is interrupted in one of the nodes, the data remains in the other node without being lost.

The client, a data node, and a parity node are connected via a network such as a storage area network (SAN) or a local area network (LAN). The "data node" is a node which stores user data. The "parity node" is a node which stores a parity. A node to be the data node or a node to be the parity node may be the same regardless of the stripe (for example, the node (203B) may be a parity node for any stripe), or may be different depending on the stripes (for example, for a certain stripe, the node (203B) is the parity node, and for another stripe, the node (203A) may be the parity node).

Data write processing includes three processing, write-back write processing, old data advance transfer processing, and destaging processing. An example of a processing flow of each processing will be described with reference to FIG. 1. The node (203A) in FIG. 1 executes processing of the data management function, and the node (203B) executes processing of the parity management function.

<Write-Back Write Processing>

The write-back write processing is processing of storing the updated data (D1') from the client (101) in a cache memory (121A) in the replication source node (203A) and in the cache memory (121B) in the replication destination node (203B), that is, processing of duplicating the updated data (D1') in different nodes (203). The write-back write processing starts when the client (101) transfers (151) a write request of the updated data (D1') to the node (203A) via a network, and the node (203A) receives the write request. The "updated data" is the updated user data. The write request includes information necessary for the data write processing, such as a node ID uniquely identifying a node which manages the updated data, a storage device ID uniquely identifying a storage device (206) of the node with the node ID, a size of the updated data, and a write position of the updated data.

The write-back write processing includes the following processing.

That is, the node (203A) registers (132) the updated data (D1') from the client (101) to the cache memory (121A) of the node (203A) based on information (information necessary for the data write processing) in the write request.

Then, the node (203A) refers to the management information (284A) to select the node (203B) which receives power from the power supply (241B) different from the power supply (241A) as a replication destination node of the updated data (D1'). The node (203A) transfers (152) the updated data (D1') to the selected node (203B). The management information (284) includes information such as node IDs of all nodes in each domain and a data configuration (positions of data and parity) for each stripe. In the present embodiment, since the power supply (241) exists for each domain, if the domain is different, the power supply (241) is also different. In other words, in the present embodiment, the domain corresponds to a power supply range of the power supply (241).

Next, the node (203B) receives the updated data (D1') transferred from the node (203A), and registers (133) the updated data (D1') in the cache memory (121B). When the updated data (D1') is registered in the cache memory (121B), the node (203B) returns (153) a result (completion response) to the node (203A).

Finally, the node (203A) receives the result from the node (203). When receiving the result, the node (203A) returns (154) a result (completion response) of the received write request to the client (101).

As described above, although the updated data (D1') from the client (101) is duplicated in the cache memory (121A) in the data node (203A) and the cache memory (121B) in the parity node (203B), the result is returned when the updated data (D1') is written to the cache memory (121B), so that the write response time to the client (101) can be reduced. Since the power supply (241A) of the data node (203A) and the power supply (241B) of the parity node (203B) are different and separated power supplies, the updated data (D1') exists in one node even if a power is interrupted in the other of the nodes before the permanence of updated data (D1').

<Old Data Advance Transfer Processing>

The old data advance transfer processing is processing of transferring old data corresponding to the updated data to the replication destination node of the updated data before the destaging processing.

The old data advance transfer processing includes the following processing.

That is, the node (203A) reads (155) old data (non-updated data) (D1) of an updated data (D') of the node (203A) from a storage device (206A) at an appropriate timing, and registers (135) the read old data (D1) in the cache memory (121A). The node (203A) transfers (156) the old data (D1) to the replication destination node (203B) of the updated data (D1'). Examples of the appropriate timing for transferring the old data (D1) includes a case where memory release is necessary due to a use area of the cache memory (121A) of the replication source node (203A) of the updated data (D1') exceeding a threshold value, or a case where the updated data (D1') of the cache memory (121A) is destaged in the storage device (206A).

Next, the node (203B) receives the old data (D1) from the node (203A), and registers (136) the old data (D1) in the cache memory (121B).

As described above, in the processing of destaging (storing) the updated data (D1') registered in the cache memory (121A) of the replication source node (203A) in the storage device (206A), it is unnecessary to transfer the old data (D1) necessary for the update processing of an old parity (P) corresponding to the updated data (D1'), so that the processing time of the destaging processing can be reduced, and the memory release time of the updated data (D1') registered in the cache memory (121B) of the parity node (203B) can be reduced. The "old parity" is a non-updated parity corresponding to the old data.

<Destaging Processing>

The destaging processing may be processing performed asynchronously with the data write processing performed in response to the write request from the client (101), and is processing of storing dirty data (data not stored in the storage device (206)) in the cache memory (121) to the storage device (206). The node (203A) starts the destaging processing at an appropriate timing.

The destaging processing includes the following processing.

The node (203A) writes (157) the updated data (D1') in the cache memory (121A) to the storage device (206A), and releases a use area of the updated data (D1') from the cache memory (121A).

Next, the node (203A) refers to the management information (284A) to specify a node (203B) having the old parity (P) corresponding to a storage destination stripe of the updated data (D1'), and transfers (50) a parity update request to the specified node (203B). The parity update request includes at least one of an ID of the storage destination stripe of the updated data (D1') and a position of the old parity (P).

Next, the node (203B) receives the parity update request from the node (203A). In response to the parity update request, the node (203B) reads (158) the old parity (P) corresponding to the updated data (D1') from the storage device (206B), and registers (139) the old parity (P) in a cache. The node (203B) generates (159) an updated parity (P'), which is a parity after update of the old parity (P), from three pieces of data of the updated data (D1'), the old data (D1), and the old parity (P) in the cache memory (121B), and stores (141) the updated parity (P') in the storage device (206B). Then, the node (203B) returns (51) a result of the parity update request (completion response) to the node (203A).

The above is the outline of the data write processing. Hereinafter, the present embodiment will be described in detail.

FIG. 2 is a block diagram showing a schematic configuration of a distributed storage system according to the present embodiment.

The distributed storage system includes at least one storage cluster (201). At least one client (101) is connected to the storage cluster (201) via a network (211). When there are two or more storage clusters, system redundancy can be realized among a plurality of storage clusters.

The client (101) is a computer used by a user to use a storage service provided by the storage cluster (201). The client (101) includes software and hardware necessary for using the storage service via the network (211).

The network (211) is a communication network which interconnects the client (101) and the storage cluster (201). For example, the network (211) may be LAN, SAN, Ethernet (register trademark), InfiniBand (register trademark), Fiber Channel, or the like.

The storage cluster (201) is a system which provides a storage service to the client (101). The storage cluster (201) includes at least one domain (202) and at least one management server (221).

The domains (202) are interconnected by at least one network. In the illustrated example, the domains are interconnected by two networks of a front end network (212) and a back end network (213). The configuration of the domain will be described later.

The front end network (212) is a communication network connected to a network (211) which connects the client (101) and the storage cluster (201). Accordingly, the client (101) is connected to all the domains (202) in the storage cluster (201) via networks. The front end network (212) may be a communication network of the same kind as the network (211).

The back end network (213) is a communication network connected only between domains. The back end network (213) may be a communication network of the same kind as the network (211).

The management server (221) is a computer which manages the storage cluster (201). The management server (221) is connected to all the domains (202) which exist in the storage cluster (201) via the front end network (212). The network which connects the management server (221) and the domains (202) may be the back end network (213), a dedicated line, or other communication line or communication device instead of or in addition to the front end network (212). The management server 221 may be an example of a management system. The "management system" may be configured with one or more computers. Specifically, for example, when a management computer has a display device and displays information on the display device, the management computer may be the management system. For example, when a management computer (for example, a server) transmits display information to a remote display computer (for example, a client) and the display computer displays the information (when the management computer displays information on the display computer), a system which includes at least the management computer of the management computer and the display computer may be the management system. The management server (221) may include the interface unit, the storage unit, and the processor unit connected to the interface unit and the storage unit. The storage unit may store a node management program (20), and the processor unit may execute the node management program (20). The management server (221) (an example of the management system) may belong to the domain (202) of the storage cluster (201) or may be the node (203) which belongs to the domain (202). Accordingly, it is not necessary to provide a dedicated management server in the storage cluster (201), and all the nodes (203) in the storage cluster (202) can be transparently configured without being aware of a dedicated function.

The node (203A) described above is a node in a domain (202A), and the node (203B) described above is a node in a domain (202B). In the following description, in order to make it easy to understand which node existing in which domain or which element in the node existing in which node, an end of a reference sign numeral of the node in the domain (202α) (α is A, B, C, . . . ) is set to "α", and an end of a reference sign numeral of the element in the node (203α) is set to "α".

FIG. 3 is a block diagram showing a configuration of the domain.

The domain (202) includes at least one power supply (241) and at least one node (203).

The power supply (241) supplies power to the node (203) in the same domain (202). At least one power supply (241) is prepared for each domain (202). All the nodes (203) in the domain (202) are connected to the power supply (241) of the domain (202) to which the node (203) belongs. Therefore, even when the power supply (241) used in the domain (202) cannot function due to a failure or the like, the power supply used in another domain (202) is not affected. Accordingly, the data can be made redundant by duplicating the data on the cache memory between the nodes which belong to the different domains (202).

The node (203) is a computer which realizes the storage service. In the present embodiment, the node (203) is a physical computer, but the node may be a virtual machine such as a VM. The node is connected to the power supply (241) of the domain (202) to which the node belongs. The nodes (203) are interconnected via a network with the client (101) and all the nodes in all the domains in the storage cluster (201). In the present embodiment, the nodes (203) are interconnected via the front end network (212) and the back end network (213). There are two kinds of nodes, which are nodes having the data management function and nodes having the parity management function. The node (203) may be a node having only the data management function, a node having only the parity management function, or a node having both the data management function and the parity management function. At least one node (203) may have a function as the management server (221).

FIG. 4 is a block diagram showing a configuration of the node.

The node (203) is configured with a storage controller (205), the storage device (206), and a power supply system IF (207). At least one of the storage controller (205), the storage device (206), and the power system IF (207) may have a configuration of redundancy of two or more.

The storage controller (205) includes a front end NW-IF (251), a back end NW-IF (252), a memory (254), a storage device IF (255), and a CPU (253) connected thereto.

The front end NW-IF (251) is a communication interface device used for connection between the node (203) and the front end network (212). The back end NW-IF (252) is a communication interface device used for connection between the node (203) and the back end network (213).

The memory (254) stores programs and management information (284) necessary for the node to realize the storage service provided by the storage cluster. The programs include, for example, an inter-node cooperation program (281) having a function necessary for executing processing in cooperation between nodes, a data management program (282) for executing processing necessary for the data management function, and a parity management program (283) for executing processing necessary for the parity management function. A program which includes these programs (281), (282), and (283) may be a software defined storage (SDS). The management information (284) includes a table necessary for the above program to execute processing.

The memory (254) includes the cache memory (121). In the present embodiment, the cache memory (121) is a partial area provided on the memory (254).

The CPU (253) executes the program in the memory (254).

The storage device IF (255) is a communication interface device used for connection between the storage controller (205) and the storage device (206).

The storage device (206) includes a storage device IF (265), a memory (262), a switch (263), a plurality of (or one) storage devices (264) or one storage device (264), and a CPU (261) connected thereto. The storage device IF (265) is a communication interface device connected to the storage device IF (255). The memory (262) stores data input to and output from the storage device 206 and programs executed by the CPU (261). The switch (263) switches the connection destination storage device (264) to the CPU (261) or the memory (262). The storage device (264) is a PDEV, and is, for example, an HDD or an SSD.

The power supply system IF (207) is an interface device used for connection between the node (203) and the power supply (241) of the domain to which the node belongs.

At least one of the IF (251) and the IF (252) is an example of an interface unit. The memory (254) is an example of the memory unit. The storage device (206) is an example of the PDEV unit. The CPU (253) is an example of the processor unit. Storing data in the cache memory (121) may be referred to as "cache", and storing data in the storage device (206) may be referred to as "permanent".

FIG. 5 shows a table in the management information (284).

The management information (284) includes a configuration management table (T101) and a stripe management table (T201).

The configuration management table (T101) shows relationship between the domain and the node. The configuration management table (T101) has an entry for each domain (202). Each entry stores information such as a domain ID (C101) or a node ID (C112). The domain ID (C101) shows a domain ID capable of uniquely specifying the domain (202). The node ID (C112) shows a node ID capable of uniquely specifying the node.

The stripe management table (T201) shows a data position and a parity position for each stripe. Specifically, for example, the stripe management table (T201) has an entry for each stripe. Each entry stores information such as a stripe ID (C201), a data position (C202), and a parity position (C203). According to the example of FIG. 5, for each stripe, the data strip and the parity strip are configured in three to one.

The stripe ID (C201) shows a stripe ID capable of uniquely specifying the stripe.

The data position (C202) is position information of each of all data in the stripe. For example, for each data, the position information is expressed by (node ID, storage device position in the node). The "storage device position in the node" may include at least one of a logical address (for example, a logical address in a node area) such as a logical block address (LBA), and a physical address (for example, an ID of the storage device (264) and a logical address in a logical address space provided by the storage device (264)) corresponding to the logical address.

The parity position (C203) is position information of each of all parity in the stripe. The position information is also expressed by (node ID, storage device position in the node).

FIG. 6 is a block diagram showing an outline of write-through write processing. There are some common points between the write-through write processing and the write-back write processing described with reference to FIG. 1 (for example, the node with the different power supply (241) is selected as the transfer destination). Here, a difference between the write-through write processing and the write-back write processing will be mainly described.

The write-through write processing starts when, for example, the node (203A) receives (351) a write request of the updated data (D1') from the client (101) via the network.

The node (203A) registers (332) updated data, which is the updated data (D1') from the client (101), in the cache memory (121A). Then, the node (203A) stores (352) the updated data (D1') in the storage device (206A).

Next, the node (203A) reads (353) the old data (D1) corresponding to the updated data (D1') from the storage device (206A), and registers (335) the old data (D1) in the cache memory (121A). The node (203A) generates (354) an intermediate parity (Q) from the updated data (D1') and the old data (D1), and registers (336) the intermediate parity (Q) in the cache memory (121A). Then, the node (203A) refers to the management information (284A) to specify the parity node (203B) corresponding to the updated data (D1'), and transfers (356) the intermediate parity (Q) to the specified node (203B).

Next, the node (203B) receives the intermediate parity (Q) transferred from the node (203A), and registers (337) the intermediate parity (Q) in the cache memory (121B). Then, the node (203B) reads (357) the old parity (P) corresponding to the intermediate parity (Q) from the storage device (206B), and registers (339) the old parity (P) in the cache memory (121B). The node (203B) generates (358) an updated parity (P') from the intermediate parity (Q) and the old parity (P) on the cache memory (121B), and registers (340) the updated parity (P') in the cache memory (121B). Then, the node (203B) stores (359) the updated parity (P') in the storage device (124), and returns (360) a result to the node (203A).

Finally, the node (203A) receives the result from a node (203B) (103) and returns (361) a result to the client (101).

As described above, in the write-through write processing, a transfer destination of the intermediate parity (Q) is the node (203B) which receives power from the power supply (241B) different from the power supply (241A) of the node (203A) which receives the updated data (D1') from the client (101).

FIG. 7 is a block diagram showing an outline of full stripe write processing. FIG. 7 shows an example when one stripe is configured with three user strips and one parity strip.

The full stripe write processing is processing of writing user data units (all updated data to be written in one stripe) in one stripe. The full stripe write processing starts when, for example, the node (203A) receives (451) a write request of all updated data (D1'), (D2'), and (D3') to be written in one stripe via the network.

The node (203A) registers (432) the updated data (D1'), (D2'), and (D3') from the client (101) in the cache memory (121A). Then, the node (203A) generates (456) an updated parity (P') from the updated data (D1'), (D2'), and (D3'), and registers (433) the updated parity (P') in the cache memory (121A).

The processing contents of the subsequent processing are different depending on the write-back (the method of returning the result when data is written to the cache memory) and the write-through (the method of returning the result when data is written to the storage device).

First, processing when the full stripe write processing is performed by the write-back will be described.

The node (203A) refers to the management information (284A) to specify the storage destination stripes of the updated data (D1'), (D2'), and (D3'), and specifies data positions and parity positions (that is, transfer destination nodes) for the specified stripes. According to the example of FIG. 7, a node (203C) and a node (203D) performing the data management function and the node (203B) performing the parity management function are specified as the transfer destination nodes. The node (203A) transfers (452) the updated data (D2') to the transfer destination node (203C), transfers (454) the updated data (D3') to the transfer destination node (203D), and transfers (457) the updated parity (P') to the transfer destination node (203B). The node (203C) registers (434) the received updated data (D2') in the cache memory (121C) and returns (453) a result to the node (203A), and the node (203D) registers (435) the received updated data (D3') in the cache memory (121D) and returns (455) a result to the node (203A). The node (203B) registers (436) the received updated parity (P') in the cache memory (121B), and returns (458) (486) a result to the node (203A). Finally, when the node (203A) receives the results from the three nodes (203B), (203C), and (203D) respectively, the node (203A) returns (459) a result to the client (101). Thereafter, each of the nodes (203A) to (203D) executes the destaging processing of the updated data (or updated parity) in the cache memory at an appropriate timing.

Next, processing when the full stripe write processing is performed by the write-through will be described.

When performing the write-through, the node (203A) stores (460) the updated data (D1') managed by the node (203A) among the updated data (D1'), (D2'), and (D3') in the storage device (206A). Then, the node (203A) transfers (452) the updated data (D2') to the transfer destination node (203C), transfers (454) the updated data (D3') to the transfer destination node (203D), and transfers (457) the updated parity (P') to the transfer destination node (203B).

The node (203C) registers (434) the received updated data (D2') in the cache memory (121C), stores (461) the updated data (D2') in the storage device (206C), and returns (453) a result to node (203A), and the node (203D) registers (435) the received updated data (D3') in the cache memory (121D), stores (462) the updated data (D3') in the storage device (206D), and returns (455) a result to node (203A). The node (203B) registers (436) the received updated parity (P') in the cache memory (121B), stores (463) the updated parity (P') in the storage device (206B), and returns (486) a result to the node (203A). Finally, when the node (203A) receives the results from the three nodes (203B), (203C), and (203D) respectively, the node (203A) returns (459) a result to the client (101).

With either the write-back or the write-through, for each of the updated data (D2') and the updated data (D3'), among the updated data (D1'), (D2'), and (D3'), other than the updated data (D1') which is made permanent in the node (203A), the node (203A) may select n nodes (n is a natural number) each receiving power from a power supply different from the power supply (241A) of the node (203A) as replication destinations of the updated data, and transfer the updated data to each of the selected n nodes.

FIG. 8 is an example of a flowchart of the data write processing. The data write processing is executed, for example, when a write request is received from the client (101), by the CPU (253) of the storage controller (205) of the node which executes the data management function.

The data management program (282) refers to the received write request (S101). For example, the data management program (282) specifies information (information including the node ID, the storage device ID, the size of the updated data, and the write position of the updated data) necessary for the data write processing from the write request.

The data management program (282) determines whether the kind of the write processing is the full stripe write processing based on the specified information (S102).

If a determination result of S102 is false, the data management program (282) determines whether the kind of the write processing is write-back write processing (S103). For example, in the write request, a method to be adopted is designated among the write-back and the write-through, and the determination of S103 may be performed based on the designation. The switch between the write-back and the write-through may be executed manually or automatically (for example, by the determination by the management server (221) or the data management program (282)). For example, the write-back and the write-through can be switched as described below.

- When a certain amount or more of domains (that is, many power supplies) exist in the storage cluster (201) (for example, during normal operation), the write-back is adopted. The reason is that it is considered that there is no problem in data protection even with redundancy by the write-back.
- When a certain amount or more of domains does not exist in the storage cluster (201) (for example, when a failure occurs), the write-through is adopted. The reason is to prevent data loss.
- When a requirement of the user (such as software which uses storage) is orientated in latency performance, the write-back is adopted.
- When a requirement of the user is orientated in data protection (for example, for archiving purposes), the write-through is adopted.

If a determination result of S103 is true, the write-back write processing (FIG. 9) is executed (S104). If the determination result of S103 is false, the write-through write processing (FIG. 13) is executed (S105).

If the determination result of S102 is true, the data management program (282) determines whether the kind of the full stripe write is write-back (S106). The determination method of S106 may be the same as the determination method of S103.

If a determination result of S106 is true, full stripe write-back write processing (FIG. 14) is executed (S107). If the determination result of S106 is false, full stripe write-through write processing (FIG. 15) is executed (S108).

Finally, the data management program (282) returns a result to the client (101) (S109), and the data write processing ends.

FIG. 9 is an example of a flowchart of the write-back write processing (S104 of FIG. 8).

First, the inter-node cooperation program (281) of the data node selects a replication destination node of the updated data based on the information in the write request from the client (101) and the management information (284) (S201). As the replication destination node of the updated data, for example, the storage destination parity node of the parity corresponding to the storage destination stripe of the updated data is selected. Then, the inter-node cooperation program (281) of the data node transfers the replication of the updated data to the replication destination parity node via the network (S202). The transfer processing may be synchronous processing (in processing performed in response to the write request) or asynchronous processing (processing different from processing performed in response to the write request).

Next, the inter-node cooperation program (281) of the parity node receives the replication of the updated data from the data node via the network (S203). Then, the parity management program (283) of the parity node registers the replication of the updated data in the cache memory (121) (S204). Finally, the inter-node cooperation program (281) of the parity node returns a processing result to the data node via the network (S205).

The inter-node cooperation program (281) of the data node receives the processing result from the replication destination parity node via the network (S206), and the write-back write processing ends.

FIG. 10 is an example of a flowchart of the old data transfer processing.

First, the data management program (282) of the data node reads the old data from the storage device (206) of the data node (S301). Next, the inter-node cooperation program (281) of the data node specifies a transfer destination node of the old data based on the management information (284) held by the data node (S302). The inter-node cooperation program (281) of the data node transfers the old data to the transfer destination node specified in S302 (S303).

The inter-node cooperation program (281) of the parity node receives the old data from the data node (S304). Next, the parity management program (283) of the parity node registers the received old data in the cache memory (121) (S305). Then, the inter-node cooperation program (281) of the parity node returns a result to the data node (S306).

The inter-node cooperation program (281) of the data node receives the result from the parity node (S307), and the old data transfer processing ends.

FIG. 11 is an example of a flowchart of the destaging processing of the data node.

First, the data management program (282) of the data node selects data to be destaged based on the management information (284) (S401). Next, the data management program (282) stores the data to be destaged in the storage device (206) of the data node (S402). Then, the data management program (282) releases a use area of the data to be destaged from the cache memory (121) (S403). Finally, the inter-node cooperation program (281) transfers a parity update request which includes information (for example, a position of the data to be destaged and an ID of the storage destination strip) showing the data to be destaged to the parity node (S404), and the destaging processing of the data node ends.

FIG. 12 is an example of a flowchart of destaging processing of the parity node.

First, the inter-node cooperation program (281) of the parity node receives a parity update request including information of the data to be destaged from the data node (S501). Next, in response to the received request, the parity management program (283) specifies an old parity of the data to be destaged, and reads the specified old parity from the storage device (206) (S502). Next, the parity management program (283) generates an updated parity (parity update) using the data to be destaged, the old data of the data to be destaged, and the old parity of the data to be destaged in the cache memory (121) (S503). Then, the parity management program (283) writes the generated updated parity to the storage device (206) of the parity node (S504). Finally, the parity management program (283) releases use areas of the data to be destaged and the old data of the data to be destaged from the cache memory (121) (S505), and the destaging processing of the parity node ends. In step S505, a result for the request may be returned.

FIG. 13 is an example of a flowchart of write-through write processing (S105 of FIG. 8).

The data management program (282) of the data node stores the updated data in the storage device (206) of the data node (S601). Next, the parity management program (283) of the data node reads the old data of the updated data from the storage device (206) of the data node into the cache memory (121) (S602). Next, the parity management program (283) of the data node generates an intermediate parity by using the updated data and the old data read in S602 (S603). Next, the inter-node cooperation program (281) of the data node selects a transfer destination node (parity node) of the intermediate parity generated in S603 (S604). Then, the inter-node cooperation program (281) of the data node transfers the intermediate parity to the parity node selected in S604 (S605).

The inter-node cooperation program (281) of the parity node receives the intermediate parity from the data node (S606), and registers the intermediate parity in the cache memory (121). The parity management program (283) of the parity node reads the old parity corresponding to the intermediate parity from the storage device (206) of the parity node into the cache memory (121) (S607). The parity management program (283) of the parity node generates an updated parity by using the intermediate parity and the old parity (S608). The parity node stores the updated parity in the storage device (206) of the parity node (S609). The inter-node cooperation program (281) of the parity node returns a result to the data node (S610).

The inter-node cooperation program (281) of the data node receives the result from the parity node (S611), and the write-through write processing ends.

FIG. 14 is an example of a flowchart of the full stripe write-back write processing (S107 of FIG. 8). In the processing, it is necessary for the number of data nodes to be the same as the number of user strips which configure the stripe.

The parity management program (283) of the data node generates an updated parity by using the updated data for the stripe (S700). The inter-node cooperation program (281) of the data node specifies a replication destination data node and a replication destination parity node based on the management information (284) (S701). Then, the inter-node cooperation program (281) of the data node transfers the updated data to the replication destination data node and transfers the updated parity to the replication destination parity node (S702).

The inter-node cooperation program (281) of the replication destination data node receives the updated data from the data node, and the inter-node cooperation program (281) of the replication destination parity node receives the updated parity from the data node (S703). The data management program (282) of the replication destination data node registers the received updated data in the cache memory (121), and the parity management program (283) of the replication destination parity node registers the received updated parity in the cache memory (121) (S704). The inter-node cooperation program (281) of the replication destination data node and the inter-node cooperation program (281) of the replication destination parity node return results to the data node (S705).

The inter-node cooperation program (281) of the data node receives the results from all the replication destination nodes (S706), and the full stripe write-back write processing ends.

FIG. 15 is an example of a flowchart of the full stripe write-through write processing (S108 of FIG. 8). In the processing, it is also necessary for the number of data nodes to be the same as the number of user strips which configure the stripe.

The parity management program (283) of the data node generates an updated parity by using the updated data for the stripe, and the data management program (282) of the data node stores the updated data in the storage device (206) of the data node (S800). The inter-node cooperation program (281) of the data node specifies a replication destination data node and a replication destination parity node based on the management information (284) (S801). Then, the inter-node cooperation program (281) of the data node transfers the updated data to the replication destination data node, and transfers the updated parity to the replication destination parity node (S802).

The inter-node cooperation program (281) of the replication destination data node receives the updated data from the data node, and the inter-node cooperation program (281) of the replication destination parity node receives the updated parity from the data node (S803). The data management program (282) of the replication destination data node registers the received updated data in the cache memory (121) and stores the updated data in the storage device (206), and the parity management program (283) of the replication destination parity node registers the received updated parity in the cache memory (121) and stores the updated parity in the storage device (206) (S804). The inter-node cooperation program (281) of the replication destination data node and the inter-node cooperation program (281) of the replication destination parity node return results to the data node (S805).

The inter-node cooperation program (281) of the data node receives the results from all the replication destination nodes (S806), and the full stripe write-through write processing ends.

FIG. 16 is an example of a flowchart of node addition processing.

The node addition processing is processing of adding a node to the distributed storage system. The administrator physically connects new nodes to the storage cluster (201), and then inputs an execution instruction of the node addition processing to a node addition program (20) of the management server (221) of the storage cluster (201) using IDs of all nodes to be added as arguments. In response to the execution instruction, the node management program (20) of the management server (221) starts the node addition processing.

The node management program (20) determines an addition destination domain from an argument in the execution instruction (S901). The node management program (20) connects the node to be added to the network (212) and the network (213) of the storage cluster (201) and the node management program (20) can communicate with the node (S902). The node management program (20) adds an ID of the node to be added to the configuration management table (T101) (node ID (C102) corresponding to the addition destination domain) of at least one node (203) (S903). The node management program (20) requests synchronization of the configuration management table (T101) for all the nodes (203) in the same cluster (201) (S905). In response to the request, synchronization of the configuration management table (T101) for all the nodes (203) in the same cluster (201) is obtained (the contents are made the same). The node management program (20) requests data reconfiguration processing for all the nodes (203) in the same cluster (201) (S904). In response to the request, the data reconfiguration processing is executed for all the nodes (203) in the same cluster (201) by execution of the inter-node cooperation program (281), and the stripe management table (T201) is updated according to the processing. By the reconfiguration processing, data or parity is moved from at least a part of nodes other than the node to be added to the node to be added.

The node management program (20) determines whether the processing is completed for all new nodes to be added (S906). If a determination result of S906 is true, the node addition processing ends. If the determination result of S906 is false, S901 is performed for the unprocessed node.

In step S905, instead of synchronization between the nodes, the node management program (20) may distribute the updated configuration management table (T101) to all the nodes.

FIG. 17 is an example of a flowchart of node deletion processing.

The node deletion processing is processing of deleting a node from the distributed storage system. The administrator inputs an execution instruction of the node deletion processing to the node management program (20) using IDs of all nodes to be deleted as arguments. In response to execution of the instruction, the node management program (20) starts the node deletion processing.

The node management program (20) deletes IDs of all the nodes to be deleted from the configuration management table (T101) (node ID (C102) corresponding to the domain (202) to which the node to be deleted belongs) of at least one node (203) (S1001). The node management program (20) requests synchronization of the configuration management table (T101) for all the nodes (203) in the same cluster (201) (S1002). In response to the request, synchronization of the configuration management table (T101) for all the nodes (203) in the same cluster (201) is obtained. The node management program (20) requests data reconfiguration processing for all the nodes (203) in the same cluster (201) (S1003). In response to the request, the data reconfiguration processing is executed for all the nodes (203) in the same cluster (201) by the execution of the inter-node cooperation program (281), and the stripe management table (T201) is updated according to the processing. By the reconfiguration processing, all data (and parity) in the node to be deleted is moved to at least a part of nodes other than the node to be deleted.

The node management program (20) transmits a stop request to the node to be deleted (S1004). In response to this request, the node to be deleted is disconnected from the cluster (201).

The node management program (20) determines whether the processing is completed for all the nodes to be deleted (S1005). If a determination result of S1005 is true, the node deletion processing ends. If the determination result of S1005 is false, S1001 is performed for the unprocessed node to be deleted.

In S1002, instead of synchronization between the nodes, the node management program (20) may distribute the updated configuration management table (T101) to all the nodes.

At least one of the node addition processing and node reduction processing may be performed as follows, for example. The domain (202) may be a rack on which the node 203 (for example, a blade server) is mounted. The processing cost (for example, load of computing resource) of addition and deletion of the domain (202) is more than that of the addition and the deletion of the node (203) for the existing domain (202). Therefore, a maximum number of domains (202) which can be mounted in the cluster (201) are prepared in the cluster (201) in advance. Since a replication source node and a replication destination node have different power supplies, the node (203) is added or deleted so as to be distributed as evenly as possible in all the domains (202). Specifically, for example, instead of determining the node to be added or the node to be deleted by the administrator, the node management program (20) may determine the following so as to make the nodes distributed as evenly as possible in all domains (202).

An addition destination domain (202) or a deletion source domain (202).

The number of nodes (203) to be added or the node (203) to be deleted for each addition destination domain (202) or each deletion source domain (202) (The nodes to be added or the nodes to be deleted may be randomly determined by the determined number of nodes for each addition destination domain (202) or each deletion source domain (202).)

In the first embodiment, a node to be the data node and a node to be the parity node may be determined in advance for each stripe, or the parity nodes may be the same for all stripes. Transfer destinations of the updated data may be n nodes (n is a natural number) including the parity node. Accordingly, it is possible to enable n duplication of the updated data. The "updated data" is data conforming to a data protection technique such as RAID or erasure cording, and may be data of at least a part of data conforming to the write request.

Second Embodiment

Next, a second embodiment of the invention will be described. Hereinafter, a difference with the first embodiment will be mainly described, and description of points common to the first embodiment will be omitted or simplified.

FIG. 18 is a block diagram showing a configuration of a domain according to the second embodiment.

In the second embodiment, at least one domain (202) has a plurality of subdomains (501) for the power supply (241).

Each subdomain (501) includes at least one node (203) and at least one uninterruptible power supply (UPS) (502). The UPS (502) is an example of a sub power supply. All the nodes (203) in the subdomain (501) are connected to the UPS (502) provided in the same subdomain (501).

In the second embodiment, since the subdomain (501) has the UPS (502), data in all the nodes (203) in the subdomain (501) can be protected even when a function of the power source (241) of the domain cannot be used due to a failure or the like. Therefore, improvement of failure tolerance of the power supply (241) can be expected. For example, in addition to data redundancy between the nodes (203) which belong to the different domains (202), data can be made redundant between the nodes (203) which belong to the different subdomains (501).

FIG. 19 shows a configuration of a configuration management table according to the second embodiment.

The configuration management table (T101) has an entry for each subdomain (501). Each entry has the domain ID (C101), a subdomain ID (C301), and the node ID (C102). The domain ID (C101) shows an ID of a domain to which the subdomain belongs. The subdomain ID (C301) shows an ID of the subdomain. The node ID (C302) shows IDs of all the nodes which belong to the subdomain.

In the second embodiment, for example, the inter-node cooperation program (281) of a replication source (transfer source) node may determine a replication destination (transfer destination) node as follows. As described below, by preferentially selecting a node having the different power source (241) as a replication destination, improvement of reliability of maintaining data protection can be expected. The following (x1) to (x3) may be performed, for example, in S201 of FIG. 9.

(x1) Determining whether there is at least one node (for example, a node whose free space satisfies a predetermined condition) which can be selected as the replication destination among nodes each having the power supply (241) different from the power supply (241) of the replication source node (domain (202)).

(x2) If a determination result of (x1) is true, selecting a node as the replication source from the nodes each having the power supply (241) different from the power supply (241) of the replication source node.

(x3) If the determination result of (x1) is false, or when the number of nodes selected in (x2) is less than the number of nodes n (n is a natural number) necessary as the number of the replication source nodes, selecting a node, which has the power supply (241) same as the power supply (241) of the replication source node but has a UPS (502) (subdomain (501)) different from that of the replication source node, as the replication destination, so as to make the number of replication destination nodes be n.

In the second embodiment, at least one of the node addition processing and the node reduction processing may be performed as follows, for example. That is, in addition to that the node (203) is added or deleted so as to be distributed as evenly as possible in all the domains (202), the node (203) is added or deleted so as to be distributed as evenly as possible in all the subdomains (501) in the same domain (202). The reason is that the processing cost of the addition and the deletion of the subdomain (501) is more than that of the addition and the deletion of the node (203) for the existing subdomain (501). Specifically, for example, instead of determining the node to be added or the node to be deleted by the administrator, the node management program (20) may determine the following so as to make the nodes (203) distributed as evenly as possible in all the subdomains (501) in the addition destination domain (202) or the deletion source domain (202).

An addition destination subdomain (501) or a deletion source subdomain (501).

The number of nodes (203) to be added or the node (203) to be deleted for each addition destination subdomain (501) or each deletion source subdomain (501) (The node to be added or the node to be deleted may be randomly determined by the determined number of nodes for each addition destination subdomain (501) or each deletion source subdomain (501).).

The power supply (241) and the UPS (502) may be collectively referred to as a "power supply unit". In other words, the "power supply unit" may be any one of the power supply (241) and the UPS (502).

Third Embodiment

A third embodiment of the invention will be described. Hereinafter, differences with the first embodiment and the second embodiment will be mainly described, and description of points common to the first embodiment and the second embodiment will be omitted or simplified.

In the third embodiment, a transmission timing of old data is before a destaging timing of the updated data at a data node estimated based on an input/output (I/O) load of the data node. That is, the data node transfers the old data of the updated data to a parity node having an old parity corresponding to the old data before the estimated destaging timing.

FIG. 20 is a block diagram showing an outline of old data transfer processing according to the third embodiment.

According to an example of FIG. 20, updated data are transferred several times in the data node (203A) and the parity node (203B). Specifically, the updated data (D1') and updated data (E1') are stored in the cache memory (121A) of the data node (203A), and the non-updated old data (D1) of the updated data (D1') and non-updated old data (E1) of the updated data (E1'), and old data (F1) are stored in the storage device (206A) of the data node (203A). The updated data (D1') and the updated data (E1') as a replication of the updated data are stored in the cache memory (121B) of the parity node (203B), and parities (P), (R) and (S) respectively corresponding to the old data (D1), (E1) and (F1) are stored in the storage device (206B) of the parity node.

In this state, it is assumed that the data node (203A) receives (551) a write request of updated data (F1') of the old data (F1) from the client (101).

The data node (203A) registers (532) the updated data (F1') in the cache memory (121A). Then, the data node (203A) transfers (552) the updated data (F1') to the parity node (203B). The parity node (203B) registers (533) the received updated data (F1') in the cache memory (121B), and returns (553) a result. When receiving the result, the data node (203A) returns (554) a result to the client (101).

The data node (203A) (for example, the data management program (282)) monitors (581) the I/O load based on a data transfer amount which is an amount of data received from the client (101) and a registration status of the cache memory (121A). Based on the I/O load, the data node (203A) (for example, the data management program (282)) estimates a timing of next destaging processing, and transfers the old data before the estimated timing. For example, the data node (203A) estimates arrival time from an increase amount in a memory usage amount of the cache memory (121A) to a threshold value for determining the start of destaging processing. In FIG. 20, among the updated data (D1'), (E1'), and (F1') registered in the cache memory (121A), it is assumed that the updated data (D1') is to be destaged next. At this time, before the next destage timing estimated based on a monitoring result of the I/O load, the data node (203A) transfers the old data (D1) of the updated data (D1') to be destaged next. That is, the data node (203A) reads (555) the old data (D1) from the storage device (206A), registers (539) the old data (D1) in the cache memory (121A), and transfers (556) the old data (D1) to the parity node (203B). The parity node (203B) registers (540) the old data (D1) in the cache memory (121B). Accordingly, the parity node (203B) may include a set (582) of the updated data (D1') to be destaged next and the old data (D1) of the updated data (D1').

According to the above processing, in the destaging processing, the transfer processing of the old data corresponding to the updated data to be destaged can be reduced, and the processing time of the destaging processing can be reduced.

Fourth Embodiment

A fourth embodiment of the invention will be described. Hereinafter, differences with the first embodiment, the second embodiment, and the third embodiment will be mainly described, and description of points common to the first embodiment, the second embodiment, and the third embodiment will be omitted or simplified.

In the fourth embodiment, an example of stripe generation processing across nodes according to the invention will be described.

FIG. 21 is a block diagram showing an example of data write processing according to the fourth embodiment. In the example of FIG. 21, one stripe is configured with three data strips and one parity strip. Therefore, three data nodes (203A), (203C), and (203D), and one parity node (203B) exist in one stripe. One or more clients (101) are connected to the three data nodes (203A), (203C) and (203D). In the present embodiment, three clients (101A), (101C), and (101D) are connected to the three data nodes (203A), (203C), and (203D), respectively.

First, data is replicated from a data node to a parity node for each set of the client (101) and the data node (203). For example, the following processing is performed in a set of the client (101A) and the data node (203A).

(v1) The client (101A) transfers (651) a write request of the updated data (D1) to the data node (203A).

(v2) The data node (203A) registers (634) the updated data (D1) in the cache memory (121A).

(v3) The data node (203A) transfers (652) the updated data (D1) to the parity node (203B).

(v4) The parity node (203B) registers (641) the received updated data (D1) in the cache memory (121B).

(v5) The parity node (203B) returns (653) a result to the data node (203A).

(v6) When the data node (203A) receives the result from the parity node (203B), the data node (203A) returns (654) a result to the client (101A).

Processing such as (v1) to (v6) is also performed in each of the set of the client (101C) and the data node (203C) and the set of the client (101D) and the data node (203D). Then, each of the data nodes (203A), (203C), and (203D) destages the updated data to a storage device of the data node at an appropriate timing.

Next, the parity node (203B) generates (666) a parity (P) from the updated data (D1) of the client (101A), the updated data (E1) of the client (101C), and the updated data (F1) of the client (101D) at an appropriate timing, and stores (667) the parity (P) in the storage device (206B).

According to the fourth embodiment, the parity node can be dynamically determined for each stripe. For example, when it is found that all user data exists in different nodes for one certain stripe by inter-node communication, any node (for example, the node (203B)) other than the different nodes may be determined as the parity node by anyone of the different nodes (for example, the node (201A)).

In the fourth embodiment, each of the nodes (203A), (203C), and (203D) may perform the similar processing as, for example, the node (203A) described with reference to FIG. 1, as a transfer source node. Instead of the node (203B) reading the old parity in the cache memory (121B) and using the old parity, a parity may be generated using the updated data (D1), (E1), and (F1) for one stripe.

While some embodiments of the invention are described above, the above embodiments are described in detail to describe the invention in an easy-to-understand manner, and the invention is not necessarily limited to these having all the configurations described. It is possible to replace apart of configuration in a certain example with configuration in another example, and it is also possible to add configuration of another example to configuration of a certain example. With respect to a part of the configuration of each embodiment, it is possible to add, delete, and replace other configurations. The configuration of the drawing shows what is considered to be necessary for the description and does not necessarily show all the configurations of the product.

REFERENCE SIGN LIST

203: node

The invention claimed is:

1. A distributed storage system which receives a write request from a client, comprising:
a plurality of computers which receive power from a plurality of power supply units,
wherein a first computer, among the plurality of computers, which is a computer that receives the write request from the client, is configured to:
 (A) cache updated data which is at least a part of data accompanying the write request;
 (B) select a parity computer, which is a computer to store a parity corresponding to the updated data among computers each receiving power from a power supply unit different from a power supply unit of the first computer, as a transfer destination of the updated data for duplication; and
 (C) transfer the updated data to the selected parity computer, without waiting for storing the cached updated data in a storage device of the first computer,
wherein the parity computer is configured to:
 (D) when caching the updated data for duplication from the first computer, return a result to the first computer,
wherein the first computer is configured to:
 (E) when receiving a result of caching the updated data from the parity computer, return a result of the write request to the client without waiting for storing the cached updated data in the storage device of the first computer; and
 (F) transfer old data of the updated data to the parity computer, and
wherein the parity computer is configured to:
 (G) in the parity computer, by using the old data, the cached updated data for duplication to transfer the result of the write request to the client, and old parity corresponding to the updated data, generate an updated parity which is parity after updating the old parity.

2. The distributed storage system according to claim 1, wherein the first computer is configured to perform (E) before the cached updated data is made permanent.

3. The distributed storage system according to claim 2, wherein timing of making the cached updated data permanent is estimated by the first computer based on an I/O load in the first computer.

4. The distributed storage system according to claim 1, wherein
when write-back which is a first method is adopted, (B) to (D) are performed, and
when write-through which is a second method is adopted, instead of (B) to (D),
the first computer is configured to:
 (G) make the cached updated data permanent;
 (H) generate an intermediate parity using the updated data and the old data corresponding to the updated data; and
 (I) transfer the intermediate parity to a the parity computer, and the parity computer is configured to:
 (J) when generating updated parity using the intermediate parity from the first computer and the old parity corresponding to the updated data, and making the updated parity permanent, return a result to the first computer.

5. The distributed storage system according to claim 1, wherein
when the updated data cached in (A) is all updated data stored in one stripe, (B) to (D) are performed for each of all the updated data, and
the first computer is further configured to:

(K) generate a parity using all the updated data; and
(L) transfer the parity to a the parity computer, and the parity computer is configured to:
(M) when caching the parity from the first computer, return a result to the first computer.

6. The distributed storage system according to claim 1, wherein the number of computers which belong to the plurality of power supply units is equal.

7. The distributed storage system according to claim 1, wherein the plurality of power supply units are one or more power supplies and a plurality of sub power supplies.

8. The distributed storage system according to claim 1, wherein (B) includes the following (b1) to (b3),
(b1) determining whether there is at least one computer which is available to be the transfer destination of the updated data among the computers each receiving power from a power supply different from a power supply of the first computer;
(b2) if a determination result of (b1) is true, selecting a node as a transfer destination from nodes each receiving power from a power supply different from the power supply of the first computer; and
(b3) if the determination result of (b1) is false, or when the number of nodes selected in (b2) is less than n, selecting a computer, which has a power supply same as the power supply of the first computer but has a sub power supply different from that of the first computer, as a transfer destination, so as to make the number of transfer destination nodes be n.

9. The distributed storage system according to claim 1, wherein
when a plurality of different first computers cache all updated data corresponding to one stripe, each of the plurality of first computers is configured to perform (B) to (C),
for each of the plurality of first computers, the n second computers include a parity second computer which is a second computer having a power supply unit different from any one of the plurality of first computers, and which is a second computer storing a parity corresponding to the stripe, and the parity second computer is configured to generate a parity using all the updated data.

10. The distributed storage system according to claim 9, wherein a computer which is different depending on the stripe is the parity second computer.

11. A distributed storage system which receives a write request from a client, comprising:
a plurality of computers which receive power from a plurality of power supply units,
wherein a first computer, among the plurality of computers, which is a computer that receives the write request from the client, is configured to:
(A) cache updated data which is at least a part of data accompanying the write request
(B) select n second computers, which are n computers (n is a natural number) among computers each receiving power from a power supply unit different from a power supply unit of the first computer, as transfer destinations of the updated data; and
(C) transfer the updated data to the selected n second computers, respectively, wherein at least one of the n second computers is configured to:
(D) when caching from the first computer, return a result to the first computer, wherein when the updated data cached in (A) is all updated data stored in one stripe, (B) to
(D) are performed for each of all the updated data, and the first computer is further configured to:
(K) generate a parity using all the updated data;
(L) transfer the parity to a parity second computer which is a second computer storing a parity corresponding to all the updated data, and the parity second computer is configured to:
(M) when caching the parity from the first computer, return a result to the first computer, wherein
when the updated data cached in (A) is all the updated data stored in one stripe and write-back which is a first method is adopted, (B) to (D) are performed and (K) to (M) are performed for each of all the updated data, and
when the updated data cached in (A) is all the updated data stored in one stripe and write-through which is a second method is adopted, instead of performing (B) to (D) and (K) to (M) for each of all the updated data,
the first computer is configured to:
(N) make one among all the updated data permanent; and
(O) for each of the updated data other than the one among all the updated data,
(o1) select n second computers which are n computers (n is a natural number) among computers each receiving power from a power supply unit different from the power supply unit of the first computer as transfer destinations of the updated data; and
(o2) transfer the updated data to the selected n second computers, respectively, at least one among the n second computers is configured to:
(o3) when making the updated data from the first computer permanent, return a result to the first computer, the first computer is configured to:
(P) generate a parity using all the updated data; and
(Q) transfer the parity to the parity second computer which is the second computer storing the parity corresponding to all the updated data, and the parity second computer is configured to:
(R) when making the parity from the first computer permanent, return a result to the first computer.

12. A distributed storage control method performed in a distributed storage system which receives a write request from a client, the method comprising:
(A) a first computer caching updated data, which is at least a part of data accompanying the write request from the client;
(B) the first computer selecting a parity computer, which is a computer to store parity corresponding to the updated data among computers each receiving power from a power supply unit different from a power supply unit of the first computer, as a transfer destination of the updated data for duplication;
(C) the first computer transferring the updated data to the selected parity computer, without waiting for storing the cached updated data in a storage device of the first computer;
(D) the parity computer, when caching the updated data for duplication from the first computer, returning a result to the first computer,
(E) the first computer, when receiving a result of caching the updated data from the parity computer, returning a result of the write request to the client without waiting for storing the cached updated data in the storage device of the first computer;
(F) the first computer transferring old data of the updated data to the parity computer; and
(G) the parity computer, by using the old data, the cached updated data for duplication to transfer the result of the write request to the client, and old parity corresponding to the updated data, generating an updated parity which is a parity after updating the old parity.

* * * * *